(12) United States Patent
Bhojarajan et al.

(10) Patent No.: US 11,170,021 B2
(45) Date of Patent: Nov. 9, 2021

(54) DIGITAL CONTENT MANAGEMENT PLATFORM

(71) Applicant: Accenture Global Solutions Limited, Dublin (IE)

(72) Inventors: Aswin Bhojarajan, Bangalore (IN); Anil Vohra, Chinsurah-Mogra (IN); Phillip E. Hazen, Houston, TX (US); Rohith Y. Nagaraj, Bangalore (IN); Geetha Magge, Bangalore (IN); Eishvinder Ratra, Chandigarh (IN)

(73) Assignee: Accenture Global Solutions Limited, Dublin (IE)

( * ) Notice: Subject to any disclaimer, the term of this patent is extended or adjusted under 35 U.S.C. 154(b) by 195 days.

(21) Appl. No.: 16/527,763

(22) Filed: Jul. 31, 2019

(65) Prior Publication Data

US 2020/0042531 A1 Feb. 6, 2020

(30) Foreign Application Priority Data

Aug. 1, 2018 (IN) .............................. 201841028999

(51) Int. Cl.
*G06F 16/00* (2019.01)
*G06F 16/25* (2019.01)
*G06F 16/23* (2019.01)

(52) U.S. Cl.
CPC ........ *G06F 16/258* (2019.01); *G06F 16/2365* (2019.01); *G06F 16/2379* (2019.01)

(58) Field of Classification Search
None
See application file for complete search history.

(56) References Cited

U.S. PATENT DOCUMENTS

2004/0170374 A1    9/2004   Bender et al.
2009/0100068 A1    4/2009   Gauba et al.
(Continued)

OTHER PUBLICATIONS

Antidot., "Classifier" [retrieved Jul. 9, 2020] Retrieved from the internet [URL: https://www.antidot.net/classifier/] Dec. 12, 2017, as per Wayback Machine, 4 pages.
(Continued)

*Primary Examiner* — Bai D Vu
(74) *Attorney, Agent, or Firm* — Harrity & Harrity, LLP

(57) ABSTRACT

A device may receive a request to add content relating to a technology development project that is managed by a content management system. The device may convert a document associated with the content from a first format to a second format. The device may generate document information for the document that includes: document section information, intra-document relationship information, and/ or inter-document relationship information. The device may generate copies of the content that are in formats that are different than the first format. The copies may be associated with replicated section information that corresponds to the document section information for the document. The device may provide the content and the copies to publishing platforms to cause the publishing platforms to make the content and the copies available to other devices to allow the other devices to access the content and the set of copies via different publishing platforms and in different formats.

20 Claims, 14 Drawing Sheets

(56) References Cited

U.S. PATENT DOCUMENTS

| | | | |
|---|---|---|---|
| 2010/0161729 A1* | 6/2010 | Leblanc | H04L 69/28 |
| | | | 709/204 |
| 2014/0215302 A1* | 7/2014 | Little | G06F 40/174 |
| | | | 715/229 |
| 2014/0215303 A1* | 7/2014 | Grigorovitch | G06F 40/106 |
| | | | 715/229 |
| 2014/0215391 A1* | 7/2014 | Little | G06F 40/151 |
| | | | 715/810 |

OTHER PUBLICATIONS

Sephton J., "Tagging Documents Based on Important Words", Apr. 4, 2017, 4 pages.

\* cited by examiner

DIGITAL CONTENT MANAGEMENT PLATFORM

RELATED APPLICATION

This application claims priority under 35 U.S.C. § 119 to Indian Patent Application No. 201841028999, filed on Aug. 1, 2018, the content of which is incorporated by reference herein in its entirety.

BACKGROUND

A document management system (DSM) is a system that may be used to track, manage, and store documents. A content management system (CMS) may be used to manage the creation and/or modification of digital content. For example, the CMS may be used to support the management of text files, audio files, image files, multimedia files, and/or the like.

SUMMARY

According to some possible implementations, a device may include one or more memories and one or more processors, operatively connected to the one or more processors. The one or more processors may receive, from a user device, a request to add content relating to a technology development project, of a set of technology development projects that are being managed by a content management system (CMS). The content may include: new content relating to the technology development project, or an update to existing content relating to the technology development project. The one or more processors may convert a document associated with the content from a first format to a second format. The one or more processors may generate, using a set of natural language processing techniques, document information for the document that includes at least one of: document section information for the document, intra-document relationship information for the document, or inter-document relationship information that is to be used to relate the document to additional documents associated with the set of technology development projects. The one or more processors may generate a set of copies of the content that are in formats that are different than the first format. The one or more processors may generate, using the set of natural language processing techniques, replicated document information for the set of copies that corresponds to the document information of the document. The one or more processors may provide the content and the set of copies to a plurality of publishing platforms to cause the plurality of publishing platforms to make the content and the set of copies of the content available to a group of devices to allow the group of devices to access the content and the set of copies via different publishing platforms and in different formats.

According to some possible implementations, a method may include receiving, by a device and from a user device, a request to add content relating to a technology development project, of a set of technology development projects that are being managed by a content management system (CMS). The content may include at least one of: new content relating to the technology development project, or an update to existing content relating to the technology development project. The method may include converting, by the device, a document associated with the content from a first format to a second format. The method may include generating, by the device and by using a set of natural language processing techniques, document section information for the document that includes at least one of: section location information identifying locations for a set of sections within the document, or content location information identifying location for content values within the set of sections. The method may include generating, by the device, a set of copies of the content have formats that are different than the first format. The set of copies may be associated with replicated section information that correspond to the document section information for the document. The set of copies may include at least one of: a first subset of copies with a first type of format that is capable of being published to allow a group of devices to view the first subset of copies, or a second subset of copies with a second type of format that allows the second subset of copies to be provided to the group of devices. The method may include providing, by the device, the content and the set of copies to one or more publishing platforms to cause the one or more publishing platforms to make the content available to the group of devices to allow the group of devices to access the content and the set of copies in different formats.

According to some possible implementations, a non-transitory computer-readable medium may store instructions that include one or more instructions that, when executed by one or more processors of a device, cause the one or more processors to: receive, from a user device, a request to add content relating to a technology development project, of a set of technology development projects that are being managed by a content management system (CMS). The content may include: new content relating to the technology development project, or an update to existing content relating to the technology development project. The one or more instructions may cause the one or more processors to convert a document associated with the content from a first format to a second format. The one or more instructions may cause the one or more processors to generate, using a set of natural language processing techniques, document information for the document that includes: document section information for the document, and intra-document relationship information for the document. The one or more instructions may cause the one or more processors to generate a set of copies of the content that are in formats that are different than the first format. The one or more instructions may cause the one or more processors to provide the content and the set of copies to a plurality of publishing platforms to cause the plurality of publishing platforms to make the content and the set of copies available to a group of devices to allow the group of devices to access the content and the set of copies via different publishing platforms and in different formats.

DETAILED DESCRIPTION

Figure 1A:
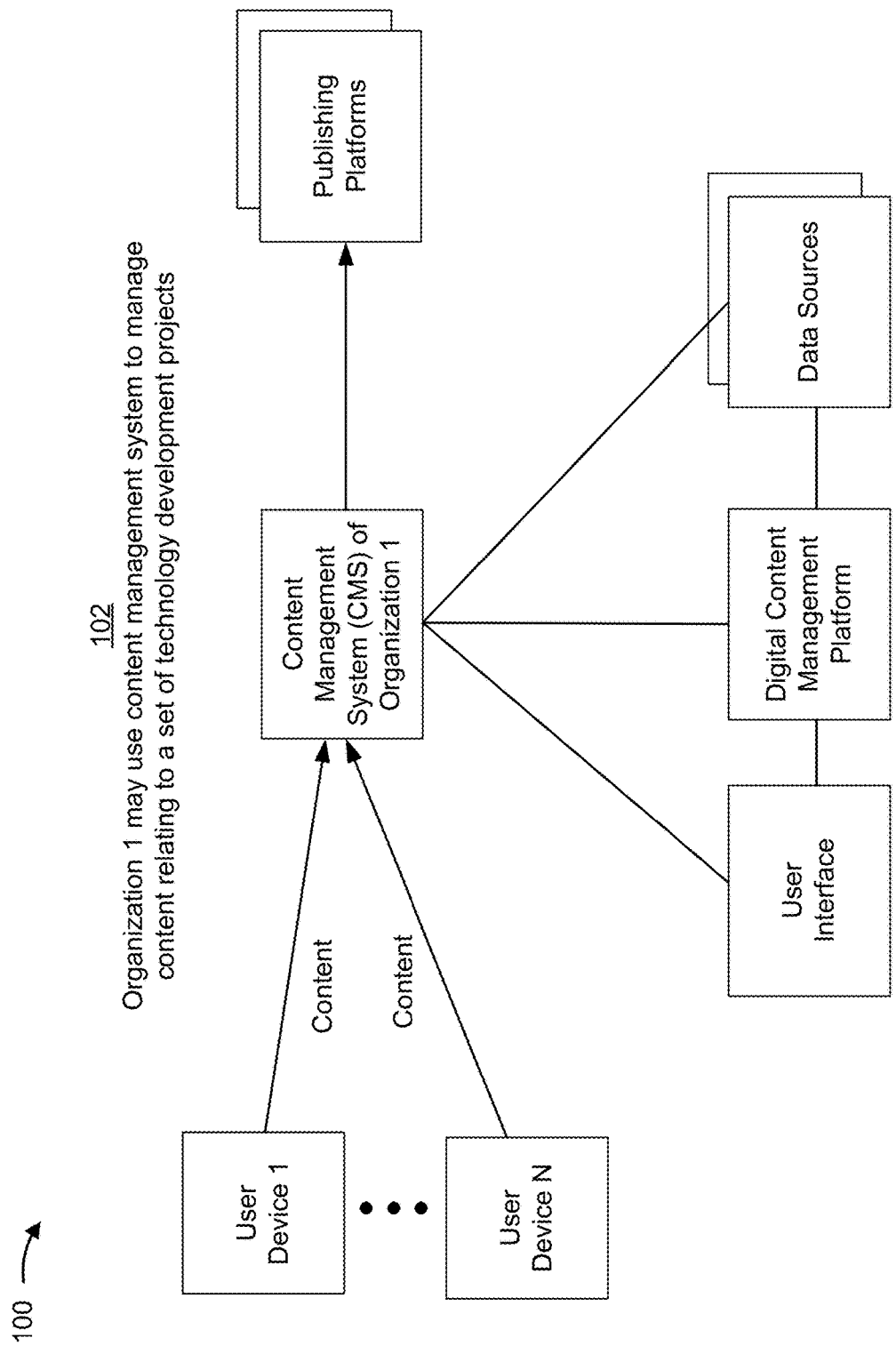
FIGS. 1A-1I are diagrams of an example implementation described herein.

The following detailed description of example implementations refers to the accompanying drawings. The same reference numbers in different drawings may identify the same or similar elements.

A content management system (CMS) may be used to manage the creation and/or modification of content. For example, an organization may use a CMS to manage content included in files, such as text files, audio files, image files, multimedia files, and/or the like. Furthermore, the CMS may include a content management application (CMA) and one or more content delivery applications (CDAs). The CMA may serve as a front-end user interface that allows a user to add, modify, and/or remove the content from the CMS. Once a request to add, modify, and/or remove the content has been made, the CDAs may handle back-end processing needed to make the addition, modification, and/or removal of the content.

However, the CMS may be unable to manage the content in a manner that is flexible (e.g., able to effectively manage change), scalable, maintainable, and/or the like. For example, the CMS may provide a document for users with content in a first format, but the content may be unavailable in a second format. As such, if a user is searching the CMS to create new content in the second format, the new user may be unable to leverage the content in the first format.

Additionally, the CMS may be unable to leverage intra-document relationships between content. For example, a first section of a first document may include information that is identical to information that is to be included as part of a first section of a second document. However, without a means for identifying the relationships between the content, a user assigned to create the second document may expend resources (e.g., human resources, computing resources, and/or the like) creating duplicative content, and storage devices may expend memory resources storing the duplicative content. Furthermore, this creates scalability issues when the CMS system is tasked with managing large data sets (e.g., gigabytes of data, terabytes of data, or more).

Additionally, the CMS may be unequipped to handle change. For example, if an organization migrates content to a new database management system, selects a new cloud services provider, and/or the like, the CMS may not store the content in a manner that allows the organization to effectively manage the change. As such, one or more devices of the organization may expend resources performing a variety of change management and error correction procedures to manage the change.

Some implementations described herein provide a digital content management platform to manage content relating to a technology development project by intelligently processing the content in a manner that associates the content with related content, makes the content accessible via multiple publishing platforms, and makes the content obtainable (e.g., downloadable) in different formats. For example, the digital content management platform may receive, from a user device, a request to add content relating to a technology development project that is being managed by a content management system (CMS). In this case, the request may include a document with the content that is to be added, and the digital content management platform may process the document to intelligently mark sections within the document, content values within the sections, inter-document relationships (e.g., between the sections and/or the content values), intra-document relationships between the document and other documents stored by the content management system, and/or the like.

In some cases, the digital content management platform may use the marked content to determine whether a discrepancy exists between the content and the related content included in other documents. As such, the digital content management platform is able to identify whether the document being added by the user device includes an error (e.g., a typographical error, etc.) and/or if one or more other documents include the error.

In some implementations, the digital content management platform may generate a set of copies of the content that are in formats that are different than a format of the document provided as part of the request. Additionally, the digital content management platform may provide the content and the set of copies to multiple publishing platforms to cause the publishing platforms to publish the content. Publishing the content may make the content available to a group of devices associated with the organization, who may then access the content via different publishing platforms and in different formats.

By making the content accessible via multiple publishing platforms and obtainable in different formats, the digital content management system improves flexibility of the CMS. Additionally, by intelligently marking the content, the digital content management system is equipped to effectively and efficiently manage change. For example, if a change is made to a first section of a first document in a first format, the digital content management system be able to implement the change in the first document, and may also implement the change in one or more copies of the document that are in different formats, have different logical placement of the content within the document, and/or the like. As such, after the change is made, subsequent users may be able to immediately access and/or obtain the same document, with the change implemented, in the different formats and/or via the different publishing platforms.

Additionally, the digital content management platform improves maintainability of the CMS by identifying and correcting discrepancies in the content and the related content. This may conserve memory resources used to store inaccurate content values, processing resources needed to debug program code of a program that crashes as a result of the inaccurate content values, and/or the like.

FIGS. 1A-1I are diagrams of an example implementation 100 described herein. For example, example implementation 100 may include group of user devices (shown as User Device 1 through User Device N), a group of data sources, a digital content management platform that is part of a content management system (CMS), and/or a group of publishing platforms.

While example implementation 100 depicts the digital content management platform as part of the content management system, in some cases, the digital content management platform (or one or more components of the digital content management platform) may be hosted external to the content management system, and may interact with the content management system using one or more communication interfaces (e.g., an application programming interface (API), etc.). Additionally, in some cases, the group of data sources may be part of a data integration services system that is external to the content management system, whereas in other cases, the group of data sources may be part of a data integration services system that is part of the content management system.

As shown in FIG. 1A, and by reference number 102, an organization (shown as Organization 1) may use the content management system to manage content relating to a set of technology development projects. The content management system may include an interface (e.g., a web interface) that allows the group of user devices to access the content, the digital content management platform for managing the content, and a group of sources for storing the content.

The set of technology development projects may include software development projects and/or hardware development projects that may be used to improve various organization processes, such as a project to improve an information technology process, a project to improve a human resources management process, a project to improve a customer service management process, a project to improve a finance and/or accounting process, a project to improve a procurement process, a project to improve a supply chain management process, a project to improve a risk management process, and/or the like.

As an example, the organization may have a problem or an inefficiency relating to a particular aspect of the procurement process. In this case, a software development project may be created and assigned to a team of software developers who are tasked with creating a software-based solution that solves the problem or improves the inefficiency.

In some implementations, a technology development project may be used to improve a process internal to the organization. Additionally, or alternatively, the technology development project may be used to improve a process of one or more client organizations.

The content management system may be used to store a set of documents relating to the set of technology development projects of the organization. The set of documents may include one or more types of content relating to the technology development project, such as a first type of content that includes deliverable work product for the technology development project, a second type of content that includes instructions used to create the deliverable work product, a third type of content that includes templated content values capable of being used as an outline when creating the deliverable work product, a fourth type of content that includes content values associated with a proposal of a recommendation relating to the technology development project, and/or the like.

The first type of content may be any deliverable work product created during a particular stage in a project development life cycle, such as deliverable work product relating to a planning phase, deliverable work product relating to a design phase, deliverable work product relating to a testing phase, deliverable work product relating to a configuration phase, deliverable work product relating to a deployment phase, deliverable work product relating to a change management phase, and/or the like. To provide a few examples, deliverable work product for a technology development project may include a statement of work (e.g., describing tasks that are to be completed for a particular project), a project initiation note document, a project plan document, a quality plan document, a test plan document, a requirements specification, a design document, a review document, a test result document, a deployment document, and/or the like.

The second type of content may include instructions that may be used to create the deliverable work product, such as instructions identifying a series of steps that may be taken to create the deliverable work product, considerations that a developer should make when creating the deliverable work product, and/or the like. The third type of content may include templated content values capable of being as an outline when creating the deliverable work product, and may include templates that correspond to the different types of deliverable work product (e.g., there may be a template for a design document, a template for a requirements specification, and/or the like). The fourth type of content may include content values associated with a proposal of a recommendation of a way to improve the technology development project, such as a proposal summarizing the recommended way of improving the technology development project, identifying an estimated cost of implementing the recommendation, and/or the like.

In some implementations, the content managed by the content management system may be in different formats. For example, the content may be managed using different file formats, such as a document (.doc) format, a presentation (.ppt) format, a portable document format (.pdf), an excel (xl) format, an extensible markup language (.xml) format, a hypertext markup language (html) format, and/or the like. Additionally, or alternatively, the content may be managed using different file types, such as a text file type, an audio file type, an image file type, a multimedia file type, and/or the like.

In some implementations, the content management system may be used to provide the content to the group of publishing platforms which may display the content to the group of user devices. For example, the publishing platforms may include an openly editable database, a web application that allows downloadable file types (e.g., .doc, .pdf, .ppt, etc.) to be accessed via a web interface, and/or the like. Additionally, or alternatively, the publishing platforms may include links whereby user devices are able to obtain (e.g., download) the content from the group of publishing platforms.

In this way, the content management system manages content relating to a set of technology development projects of the organization.

Figure 1B:
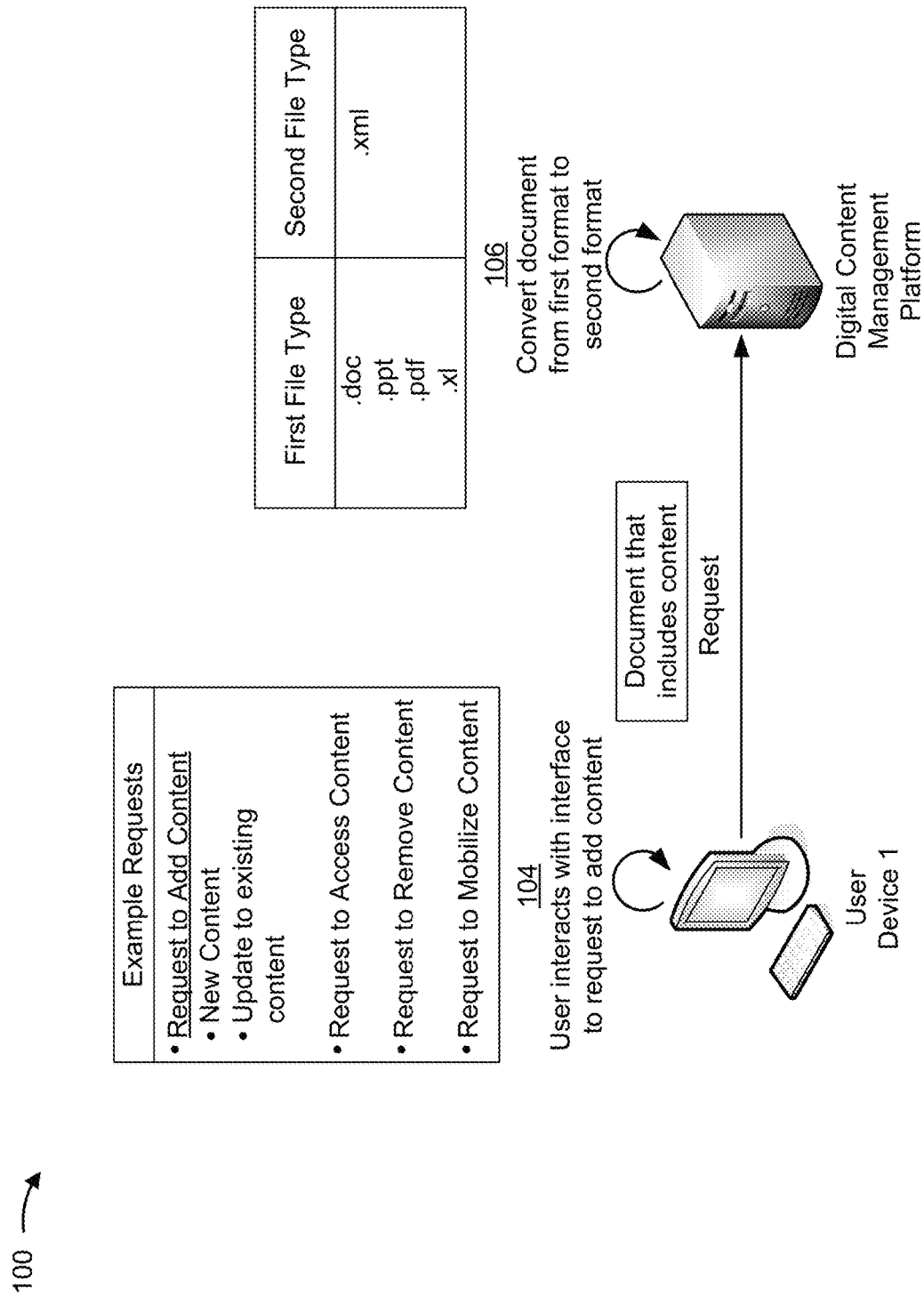

As shown in FIG. 1B, and by reference number 104, a user may interact with an interface of a user device of the organization (shown as User Device 1) to submit a request to the digital content management platform. For example, the user may interact with an interface (e.g., a web interface, an application interface, etc.) that displays a menu of content management requests that may be performed, such as a request to add content (e.g., to add new content, to update existing content, and/or the like), a request to view content, a request to remove content, a request to mobilize content (e.g., push content to an external content management system), and/or the like, as each described further herein. In some cases, the user may have to input credential information (e.g., username, password, and/or the like.) to access the interface.

In some implementations, the user device may submit a request to add content. For example, a user may have created new content that is to be added to the content management system, or may have created a modification that is to replace existing content managed by the content management system. In this case, the user may interact with the user device to select a menu option for requesting to add content, which may prompt the user to upload a document that includes the content. When the user submits the request, the user device may provide an identifier for the request, the document with the content that is being added, and any other information that the digital content management platform may use to add the content to the content management system.

In some cases, rather than uploading the document that includes the content, the user may input instructions describing the content that is to be added. For example, the user may input free-form text describing the content that is to be added, a document identifier to identify an existing document that is subject to a modification, and/or the like.

In some implementations, the user device may submit other types of requests, such as a request to access content, a request to remove content, a request to mobilize content, and/or the like. Example implementations of the other types of requests are described in FIGS. 1G-1I.

In some implementations, the user may submit the request using voice-to-text. For example, the user may speak while in range of the user device, which may cause the user device to capture the speech using voice-to-text recognition. In this case, the user device may then process the text obtained from executing the voice-to-text recognition technique to identify a type of request, may select the identified request, and may submit the request to the digital content management platform.

As shown by reference number 106, the digital content management platform may convert the document the includes the content from a first format to a second format. For example, the digital content management platform may receive a document in a first format, such as a document format, a presentation format, a PDF format, and/or the like, and may document the document to a second format, such as an XML format. By converting the document to the XML, format, the document will be in format that is suitable for converting to and from particular formats and/or for converting to and from formats that are capable of being displayed by the group of publishing platforms.

In some implementations, the digital content management platform may receive a document that is already in a format capable of being displayed by the group of publishing platforms (e.g., a .docx format, a .pptx format, etc.).

In some implementations, the digital content management platform may convert a document of a different file type (e.g., an image file type, an audio file type, a media file type, etc.) to the second file format. For example, the user device may submit a request to upload new content by submitting a video. In this case, the digital content management platform may execute a file transformation technique to transform the document from the media file type to the second file format. For example, the digital content management platform may use the file conversion technique to convert the video file to a text file, and to process the text file to identify a set of document properties that may be used to generate the document in the second file format.

In some implementations, the user may interact with a virtual agent displayed on an interface of the user device to submit a request. For example, a virtual agent may ask the user questions to gauge what the user is looking to accomplish, and may process the questions to generate a request that may be serviced by the digital content management platform.

In this way, the digital content management platform processes requests that include documents of different formats, and converts the documents to a format that is suitable for converting to and from particular formats and/or for converting to and from formats that are capable of being displayed by the group of publishing platforms.

Figure 1C:
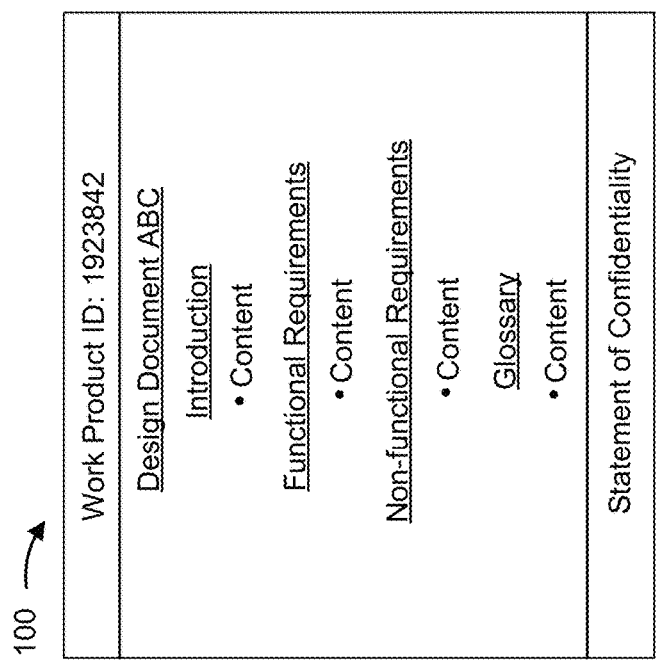
Figure 1C:
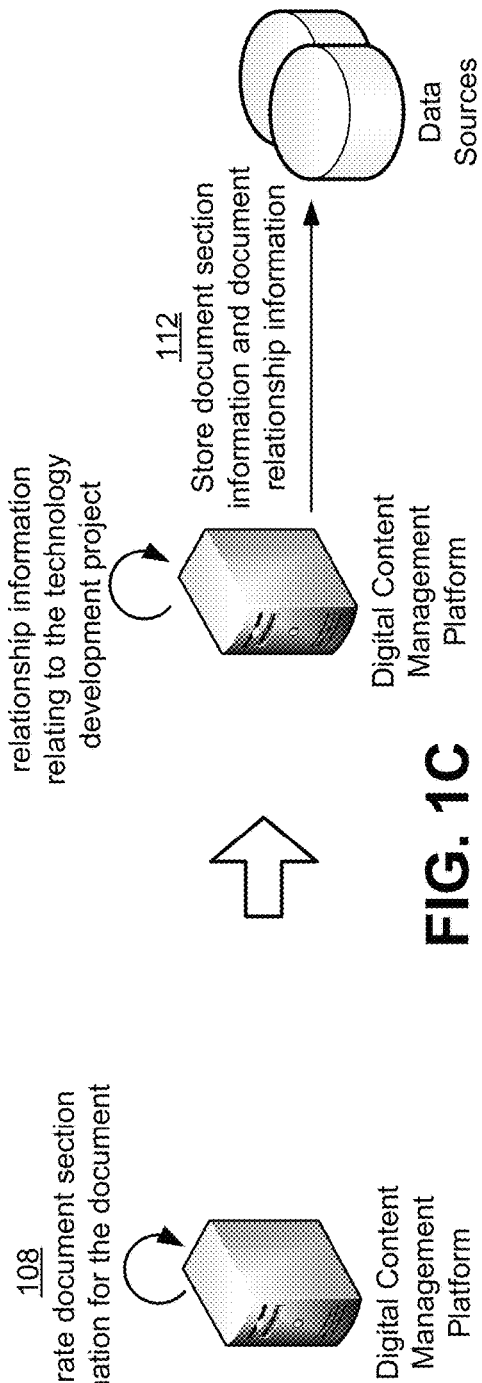

As shown in FIG. 1C, the digital content management platform may intelligently mark the document using one or more sets of natural language processing techniques. For example, the digital content management platform may intelligently mark the content by generating document information (e.g., document section information, document relationship information, and/or the like) that be used to perform actions associated with improving or supplementing the content, as described further herein.

As shown by reference number 108, the digital content management platform may generate document section information for the document. For example, the digital content management platform may generate document section information for the document by using a set of natural language processing techniques to analyze the document.

The document section information may identify sections within the document, content values within the sections, and/or the like. A section, as used herein, may refer to a particular part of the document, as may be defined by a particular area within the document, a particular metadata value or structural quality of the document, and/or the like. In the example shown in FIG. 1C, the sections of the document may include a document title (shown as Design Document ABC), a document header (shown as Work Product ID: 1923842), a group of content segment headers (shown as Introduction, Functional Requirements, Non-functional Requirements, and Glossary), and a document footer (shown as Statement of Confidentiality).

In some implementations, the set of natural language processing techniques may include techniques for analyzing structured documents, such as a metadata-based technique and/or a similar type of technique. Additionally, or alternatively, the set of natural language processing techniques may include techniques for analyzing unstructured documents and/or semi-structured documents, such as a token-based natural language processing technique (e.g., a technique using regular expressions), a category-based natural language processing technique (e.g., a named entity recognition (NER) technique), an approximation-based natural language processing technique (e.g., a fuzzy text search technique), and/or the like.

As an example, the digital content management platform may execute a metadata-based technique to identify a set of sections of the document. For example, the digital content management platform may process the document (e.g., a structured document) using the metadata-based technique to identify document metadata. The document metadata may include information associated with a document layout, information associated with positioning of content values within a document, and/or the like. A content value, as used herein, may refer to a term within the document, a value within a document, a format indicator within the document (e.g., a colon, a semi-colon, a dash, a comma, a tab, a white space, etc.), a special object within the document (e.g., if the document is embedded with video content), and/or the like. In this case, the digital content management platform may use the document metadata to identify a starting point of a section, an ending point of the section, and/or particular content values within the section. In some cases, the endpoint of the section may be identified based on a starting point of a neighboring section.

As shown by reference number 110, the digital content management platform may generate document relationship information relating to the technology development project. For example, the digital content management platform may generate document relationship information relating to the technology development project using the set of natural language processing techniques and/or one or more similar natural language processing techniques (e.g., a term frequency-inverse document frequency (DF-IDF) technique, a long short-term memory (LSTM) technique, etc.).

The document relationship information may identify intra-document relationships between the content within the document and inter-document relationships between the content of multiple documents. The intra-document relationships may include relationships between sections within the document, relationships between content values within the section, relationships between types of document metadata, and/or the like. The inter-document relationships may include relationships between documents, between sections within two or more documents, content values within two or more documents, and/or the like. In some cases, as shown, the inter-document relationships may be categories that relate to the technology development project, such as a project domain, an industry domain, a project type, a content type, a document type, a section type, and/or the like.

In some implementations, the digital content management platform may generate document relationship information using document metadata. For example, the document uploaded by the user device may include document metadata identifying the document as being part of a machine learning project. In this case, the digital content management platform may use the document metadata to generate document relationship information identifying the document as being part of a machine learning project, which may allow the document to be associated with other documents that are used as part of machine learning projects.

In some implementations, the digital content management platform may generate document relationship information without utilizing document metadata. For example, the digital content management platform may execute a natural language processing technique (e.g., a TF-IDF technique) to analyze the document relative to the entire set of documents managed by the content management system, which may allow the digital content management platform to generate document relationship information identifying the document as being part of a machine learning project. This may then allow the digital content management platform to relate the document to other documents that share the same project type (e.g., other documents for machine learning projects).

As shown by reference number 112, the digital content management platform may provide, to the group of data sources, the document section information and the document relationship information for the document. This may allow the document section information and the document relationship information to be stored in association with other documents that include related content (e.g., other documents with similar document section information and document relationship information).

In this way, the digital content management platform generates document relationship information that may be used to perform actions associated with improving or supplementing the content of the document, as described herein.

Figure 1D:
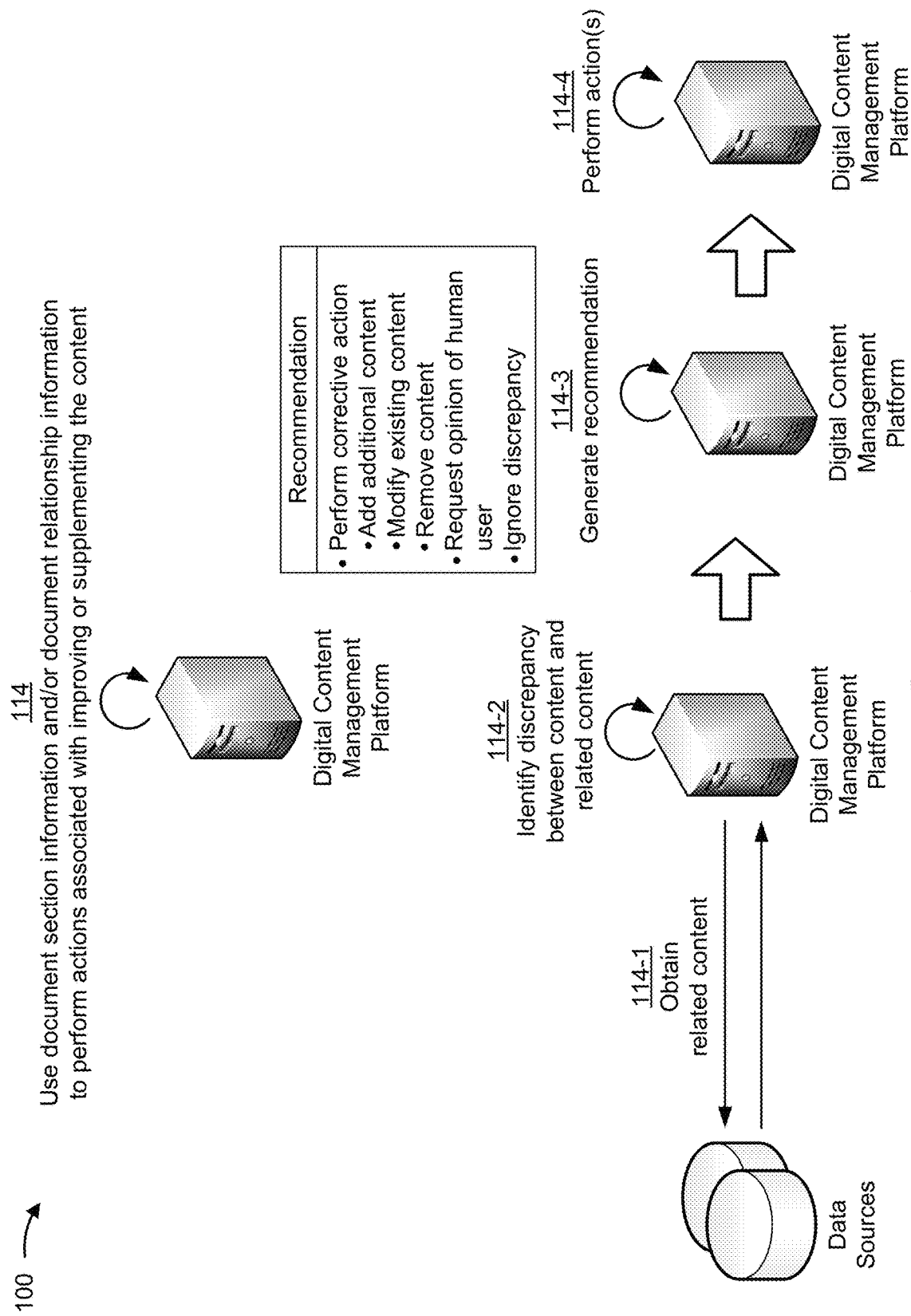

As shown in FIG. 1D, and by reference number 114, the digital content management platform may use the document section information and/or the document relationship information (collectively referred to as document information) to perform one or more actions associated with improving or supplementing the content. For example, the digital content management platform may identify a discrepancy between the content and related content that is obtained from the group of data sources, may determine one or more corrective actions (e.g., make a correction to the content, make a correction to the related content, request user permission to make the correction, and/or the like), and may perform the one or more corrective actions, as described in detail below.

As shown by reference number 114-1, the digital content management platform may obtain related content. For example, the digital content management platform may obtain the related content by using the document information to search (e.g., query) a data structure associated with the group of data sources. In this case, the search may return related content if the document information matches document information of related content (or, in some cases, satisfies a threshold level of similarity with the document information of the related content) or has been identified as relating to the same type of project as the document information of the document.

As an example, the document relationship information may indicate that the document has a project type of machine learning. As such, the digital content management platform may be able to obtain related content of documents that also have projects types of machine learning.

As shown by reference number 114-2, the digital content management platform may identify a discrepancy between the content and the related content. For example, the digital content management platform may identify a discrepancy between a content value of the document and one or more content values found in a set of additional documents that include the related content by performing a character-by-character comparison, a value-by-value comparison, a comparison of content in a section that is found in both the document and additional documents, and/or the like.

As shown by reference number 114-3, the digital content management platform may generate a recommendation. For example, the digital content management platform may generate a recommendation indicating whether to resolve the discrepancy, a recommendation of actions recommended to resolve the discrepancy, and/or the like. In some cases, the digital content management platform may process the content, the related content, and the identified discrepancy using a predictive data model that has been trained using machine learning to generate the recommendation. The recommendation may be a first recommendation to perform a corrective action (e.g., add additional content, modify existing content, remove content, etc.), a second recommendation to ask a human user to make the recommendation, a third recommendation to ignore the discrepancy, and/or the like.

In some implementations, the digital content management platform may have trained the predictive data model on historical information. The historical information may include historical content, historical document section information, historical document relationship information, historical information identifying previous discrepancies within the historical content, historical information identifying modifications made to correct the discrepancies, and/or the like.

In this case, the digital content management platform may have used one or more machine learning techniques to train the predictive data model to process the historical information and identify patterns that may be used for generating the recommendation. The patterns may include a first set of patterns for determining whether to recommend corrective actions and a second set of patterns for determining a particular corrective action to recommend.

The first set of patterns may include a pattern indicating a commonly occurring discrepancy that does not need to be corrected (e.g., document A may include a content value of 1.0, and document B may include a content value of 1.00), a pattern indicating a commonly occurring discrepancy that does need to be corrected, such as a typographic error, a duplicate content value, an instance of a content value that is included in an incorrection section, and/or the like. The second set of patterns may include a first pattern of a historical discrepancy that was frequently corrected by adding new content, a second pattern of a historical discrepancy that was frequently corrected by modifying existing content, a third pattern of a historical discrepancy that was frequently corrected by removing content, and/or the like.

The one or more machine learning techniques may include a supervised learning technique (e.g., a technique using a decision tree, linear regression, a neural network, etc.), an unsupervised learning technique (e.g., a technique using k-means clustering, association rules, etc.), a semi-supervised learning technique (e.g., a generative model, such as a Gaussian Mixture Model (GMM)), a reinforcement learning technique (e.g., a technique using Q-learning, temporal difference, a deep adversarial network, etc.), and/or the like.

In some implementations, a separate device may train the predictive data model (e.g., a desktop computer of a software developer). In this case, the separate device may provide the trained predictive data model to the digital content management platform.

In some implementations, the digital content management platform may use the predictive data model to generate the recommendation. For example, the digital content management platform may provide the content, related content, and/or the identified discrepancy as input to the predictive data model, which may cause the predictive data model to output the recommendation.

Additionally, or alternatively, the digital content management platform may generate the recommendation using a set of rules. For example, the digital content management platform may be configured with a rule indicating a scenario where a particular content value is required within a particular section of the document, a rule indicating a scenario where a particular value is never to be found in a particular section of the document, a rule indicating a scenario where a particular value is to be within a threshold range of values or one of a threshold number of possible values within a document, and/or the like. In this case, the digital content management platform may use the set of rules to process the document, the related content, and the identified discrepancy to generate the recommendation.

As shown by reference number 114-4, the digital content management platform may perform the one or more corrective actions. For example, if the recommendation is to request an opinion of a human user, the digital content management platform may provide the request to a device or account accessible to the human user. In some cases, the digital content management platform may provide, as part of the recommendation, a marked up version of the document that includes suggested changes that are to be reviewed by the human user. This may allow the human user to review the changes, and to provide approval or modified suggestions as to how to address the discrepancy to the digital content management platform.

Additionally, or alternatively, if the recommendation is the perform the corrective action, the digital content management platform may add the additional content to the document, modify the existing content of the document, or by remove particular content of the document. In this case, the digital content management platform may provide the revised content to the group of data sources (e.g., to be added to the data structure used to store the content and the related content).

In some implementations, the digital content management platform may automatically perform the one or more corrective actions. For example, the digital content management platform may be configured to automatically perform the one or more corrective actions if an output of the predictive data model and/or the rules-based technique satisfies a threshold confidence level.

In some implementations, the digital content management platform may perform the one or more corrective actions based on receiving a request from the user device. For example, the digital content management platform may generate a recommendation to perform the one or more corrective actions, and may provide the recommendation to the user device (or to another device associated with the organization). In this case, a user may view the recommendation, and may interact with the user device (or the other organization device) to provide the digital content management platform with instructions indicating whether to perform the one or more corrective actions, whether to perform some of the one or more corrective actions, whether to perform additional corrective actions, and/or the like.

In this way, the digital content management platform intelligently identifies and resolves discrepancies between documents being managed by the content management system. This conserves processing resources and/or network resources that would otherwise be used to perform error correction techniques to identify the errors within the documents after the fact, processing resources and/or network resources that would be needed to perform debugging tasks during a development and/or testing phase of the technology development project, and/or the like. Furthermore, the digital content management platform conserves memory resources by eliminating data that may not need to be stored and improves scalability by ensuring consistency in content between documents.

Figure 1E:
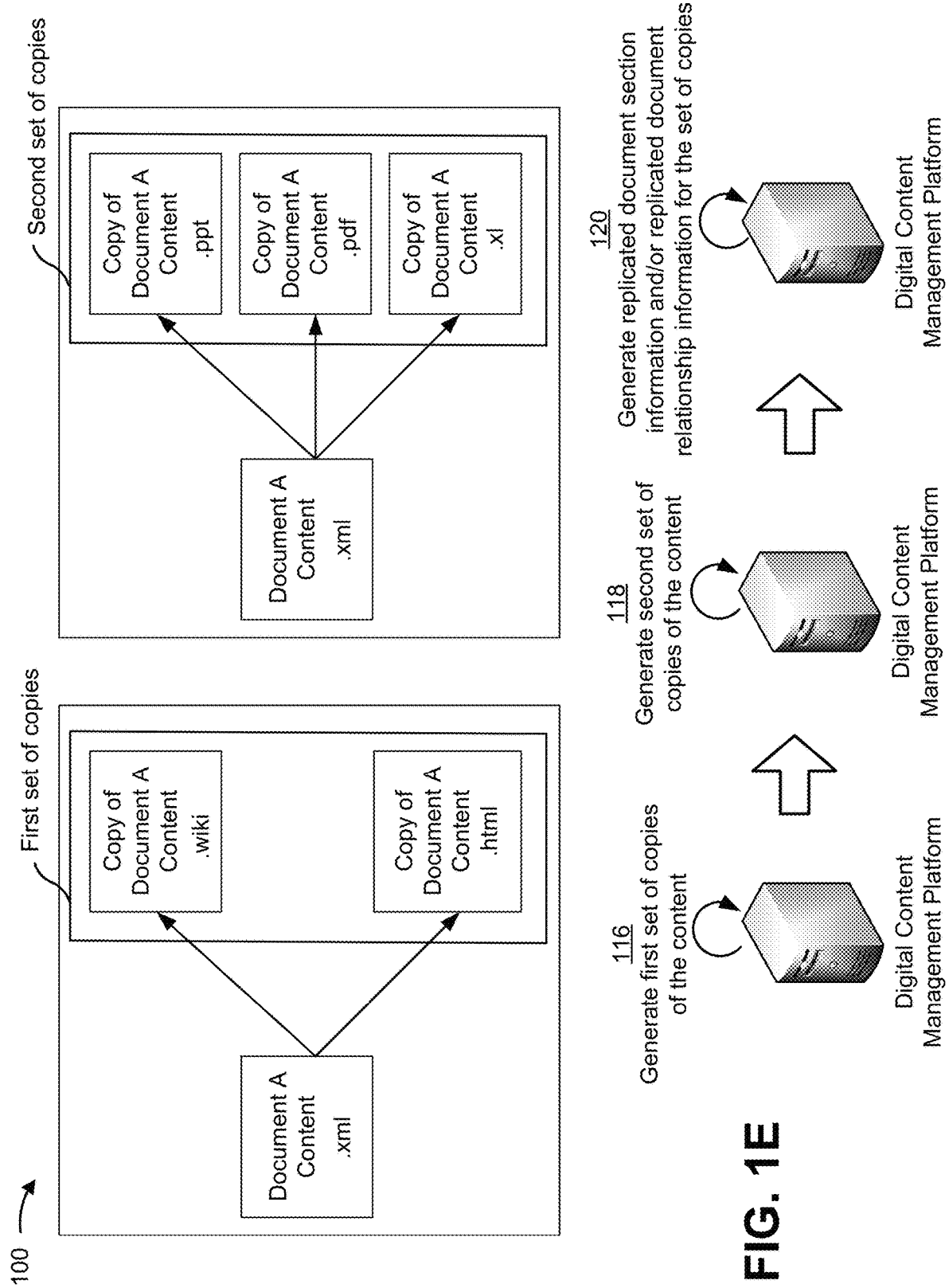

As shown in FIG. 1E, the digital content management platform may generate copies of the content of the document that are in different formats than a format used in the document provided by the user device. For example, different users within the organization may need to access the document in different formats, such as downloadable formats and/or formats that are capable of being published by the group of publishing platforms. When new content is added, or when a modification is made to existing content, the digital content management platform may need to make the new content and/or the modification to the existing content available in the different formats.

As shown by reference number 116, the digital content management platform may generate a first set of copies of the document. For example, the digital content management platform may generate a first set of copies of the content in a format capable of being published by the group of publishing platforms, such as a personal home page (PHP) format, a hypertext markup language (HTML) format, a java-related format, and/or the like.

In some implementations, the digital content management platform may generate a copy of the content using a format conversion technique. For example, the digital content management platform may execute a format conversion technique to process the document to create a copy of the content in a format that is capable of being published by a publishing platform. In this case, different format conversion techniques may be applied depending on a current format of the document and a format that is compatible with the publishing platform.

As an example, if the content of the document has previously been converted to the second format (e.g., as shown in FIG. 1B as an XML format), the digital content management platform may create a copy of the content in a third format, such as an HTML format, by using a format conversion technique that generates a cascading style sheet (CSS) file that includes a set of styles needed to accurately display the content in the HTML format.

In some implementations, the digital content management platform may generate a copy of the content that includes multiple formats. For example, if the document includes a special object (e.g., video content embedded within the document), the digital content management platform may need to generate a copy of the content that includes multiple formats, such that the special object may be accessed via the group of publishing platforms (e.g., a website displaying the content may display text in an HTML format, but may use a java-related format to display video content). In some cases, different sections of the document may be converted to different formats. For example, a first section of the document may be converted to an HTML, format, while another section of the document may be converted to a java-related format, an audio format, a multimedia format, and/or the like.

As shown by reference number 118, the digital content management platform may generate a second set of copies of the document. For example, the digital content management platform may generate a second set of copies of the document that are in a downloadable format that may be provided to other devices associated with the organization. A downloadable format may be a format that allows the document to be downloaded directly onto a particular device, such as a document format, a text format, a presentation (PPT) format, a PDF format, and/or the like.

In some implementations, the digital content management platform may generate a copy of the content using a format conversion technique. For example, the digital content management platform may execute a format conversion technique to process the content while in the first format or the second format (e.g., the format of the document as provided by the user device, the converted format as described in FIG. 1B, etc.) to create a copy of the content in a third format (e.g., a presentation format, a portable document format, etc.).

As an example, if the content is in a document format, the digital content management platform may create a copy of the content in a presentation format by using a format conversion technique that marks the document with a set of styles, and uses the set of styles to create the copy of the document in the presentation format (e.g., a section of the document may have a particular style, which may be an indicator to copy content of that section to a particular presentation slide). Similar techniques may be used to create copies of content in other formats.

As shown by reference number 120, the digital content management platform may generate replicated document section information and/or replicated document relationship information for the set of copies of the document. For example, the digital content management platform may identify document locations within the set of copies of the content that include the sections, content values, and/or the like, that were used in the document section information and/or the document relationship information. In this case, the digital content management platform may generate replicated document section information and/or replicated document relationship information that associates the replicated information with the document locations with the set of copies of the document.

In this way, the digital content management platform generates copies of the content in formats that may be published by the group of publishing platforms, formats that may be downloaded by the group of user devices of the organization, and/or copies that preserve the document section information and/or the replicated document section information of the original document.

Figure 1F:
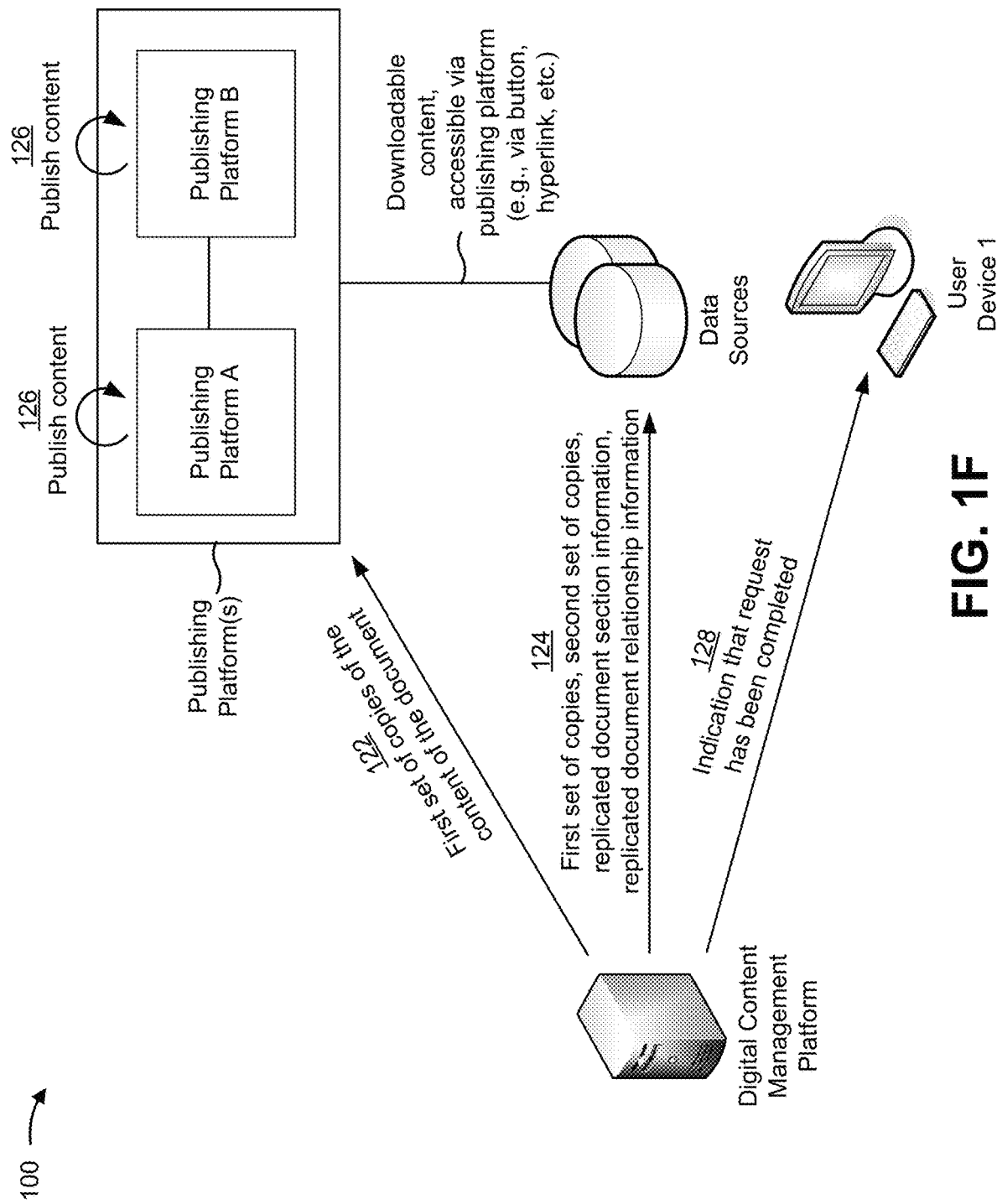

As shown in FIG. 1F, and by reference number 122, the digital content management platform may provide the first set of copies of the content to the group of publishing platforms. For example, the digital content management platform may provide a first copy of the content to a first publishing platform and may provide a second copy of the content to a second publishing platform. The publishing platforms may be web applications that support editable content, such that a user may access the publishing platforms and make real-time edits to content that other authorized users are able to view.

As shown by reference number 124, the digital content management platform may provide, to the group of data sources, the first set of copies, the second set of copies, the replicated document section information, and the replicated document relationship information. This may allow the group of data sources to associate the set of copies and replicated document information in a manner that allows the replicated document information to be referenced in a variety of different formats.

As shown by reference number 126, the group of publishing platforms may publish the content. For example, the group of publishing platforms may publish the content by adding the new content and/or by replacing existing content that has already been published. This may allow the group of user devices to visit the group of publishing platforms to access the content.

As shown by reference number 128, the digital content management platform may provide, to the user device, an indication that the request has been completed. For example, the digital content management platform may provide the indication that the request has been completed using the interface with which the user made the request and/or to another account or device associated with the organization.

In this way, when content relating to a technology development project is added to the content management system, the digital content management platform allows the content (e.g., the new content, the change to existing content, etc.) to be accessed via different published formats and/or different downloadable formats. Additionally, by identifying and correcting discrepancies in the content and the related content, the digital content management platform conserves resources that might otherwise be used to perform error correction techniques after a discrepancy causes an error, resources that might be used to debug program code associated with the error, resources that would otherwise be used to store bad data, and/or the like.

Furthermore, by intelligently recommending related content to the user device, the digital content management platform reduces a utilization of resources needed to create deliverable work product by providing the user with as much relevant information as possible before completion of a task. This conserves resources (e.g., processing resources, network resources, memory resources, human resources, etc.) that might otherwise be used to create the deliverable work product without the related content, such as resources used to perform additional research, perform additional tasks, create multiple drafts of the same deliverable work product, and/or the like.

Figure 1G:
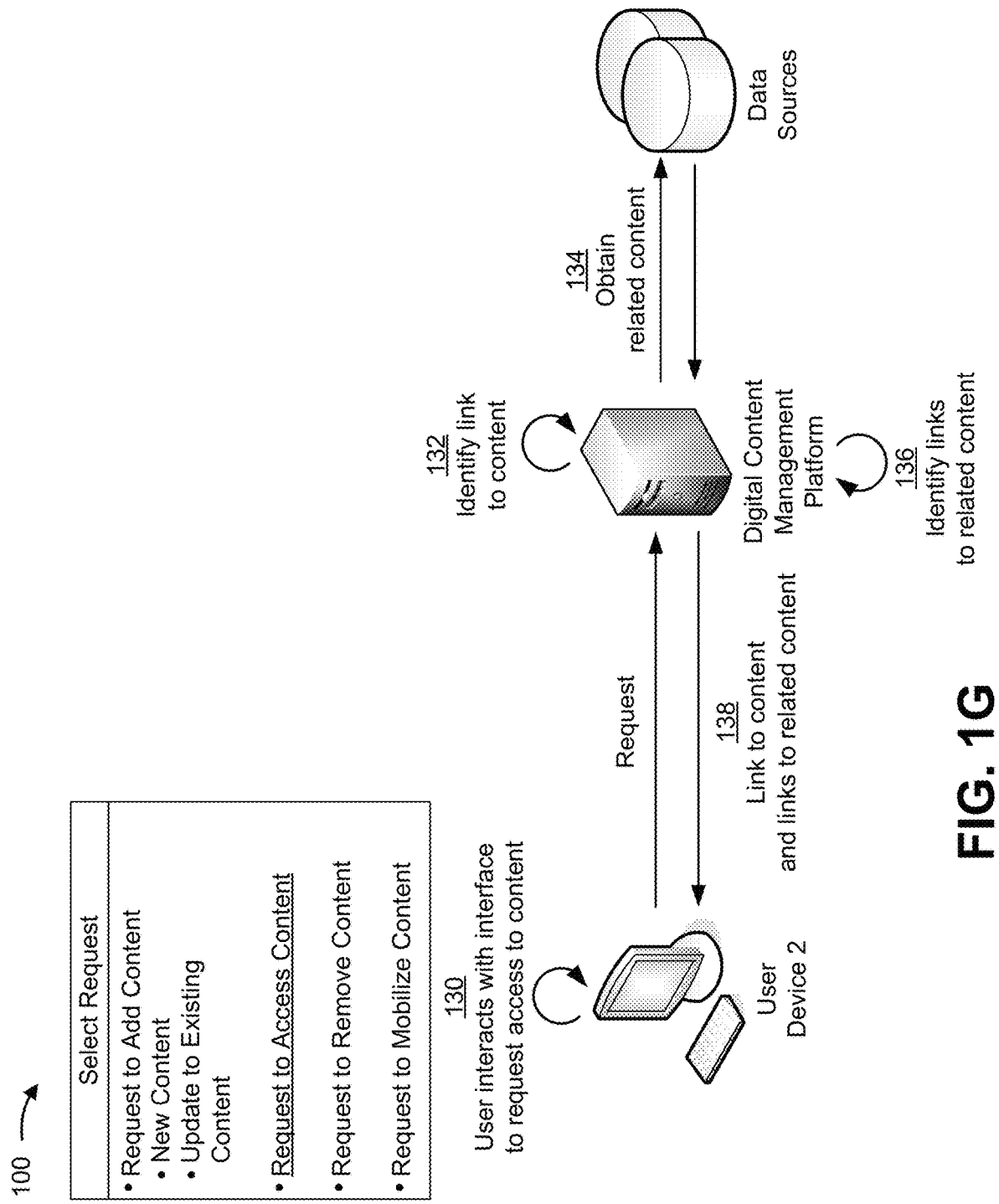
Figure 1H:
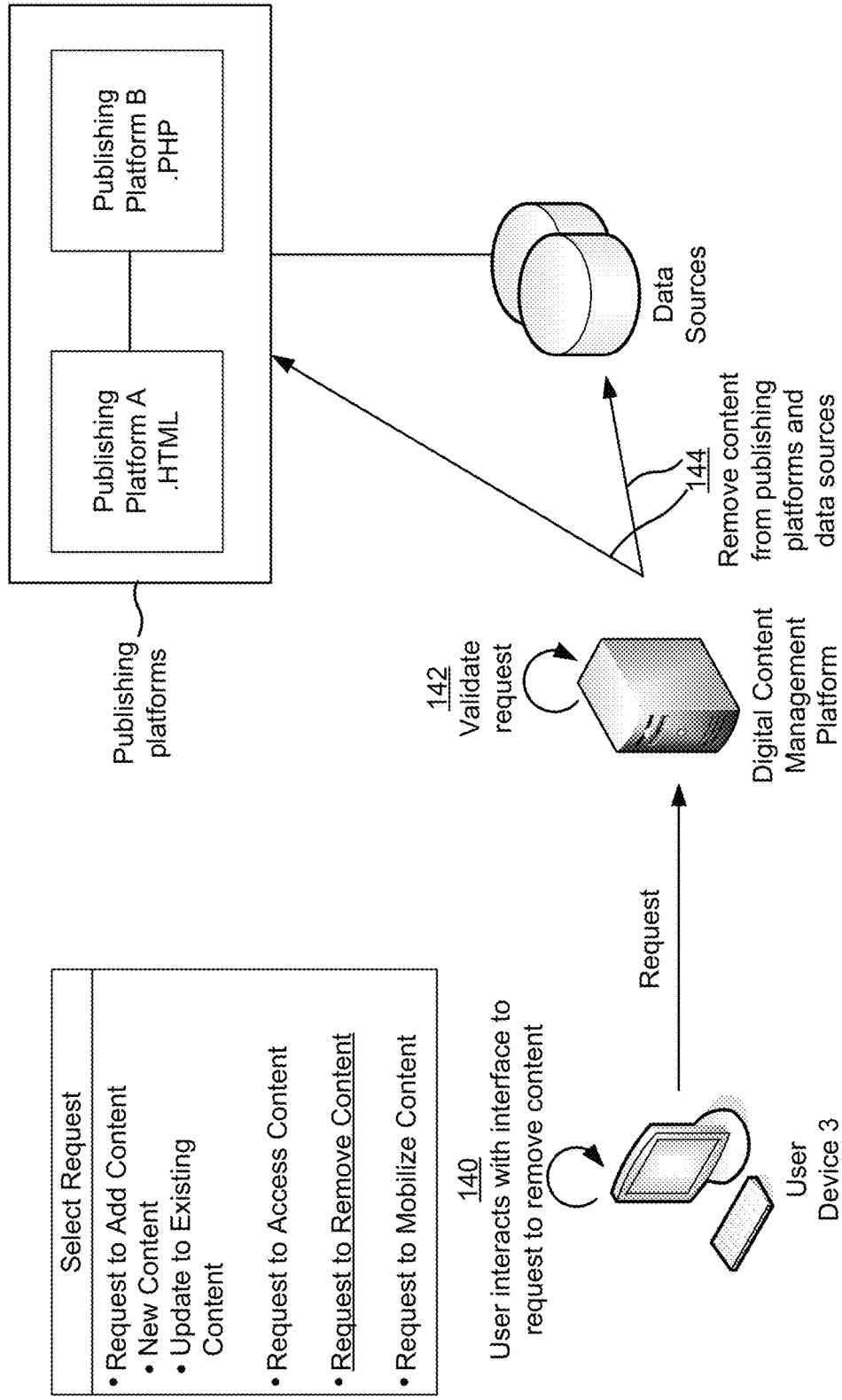
Figure 1I:
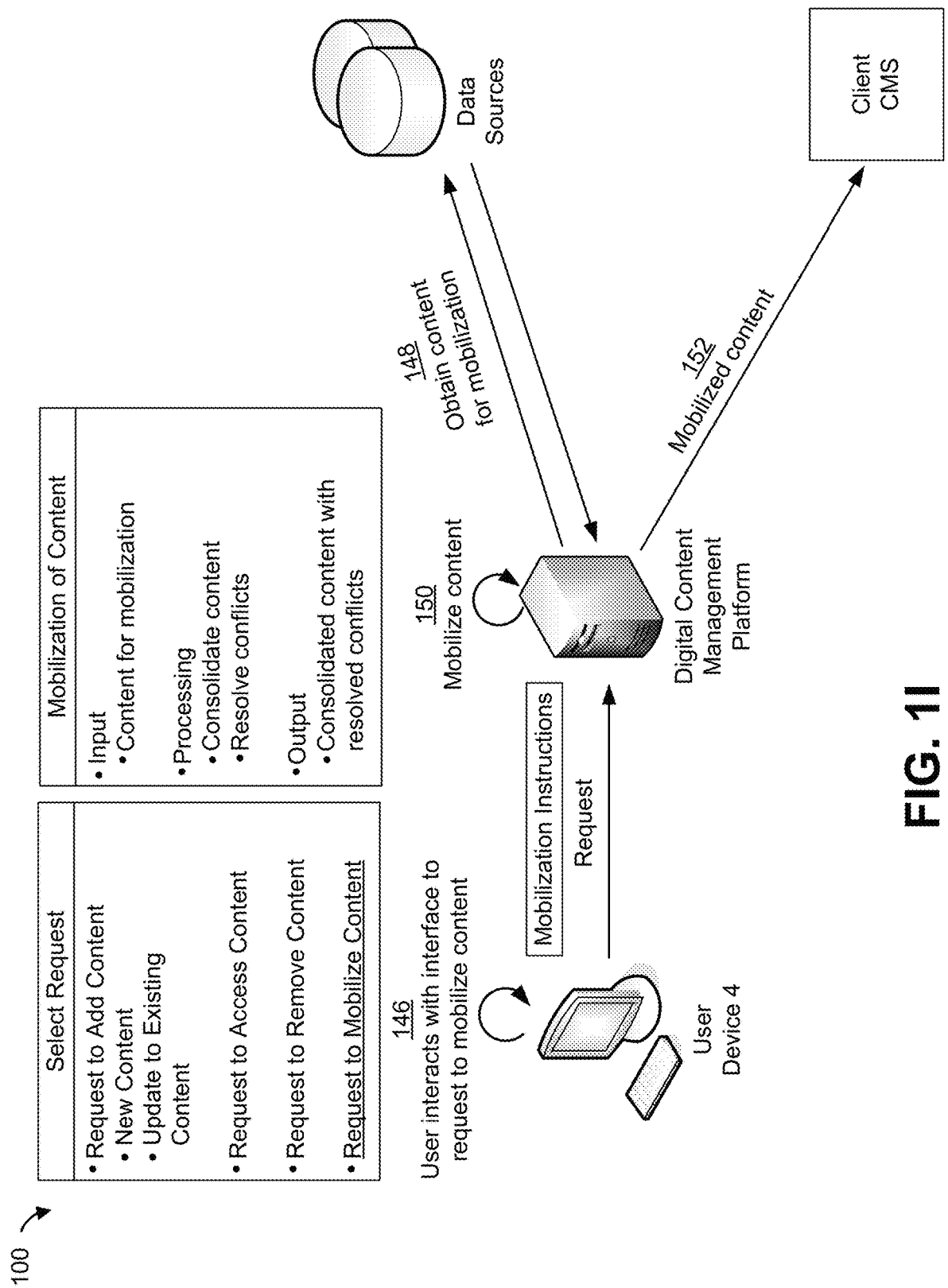

As shown in FIGS. 1G-1I, the digital content management platform may service a number of other types of requests, such as a request to access content, a request to remove content, a request to mobilize content, and/or the like.

As shown in FIG. 1G, and by reference number 130, a user may, using a user device (shown as User Device 2) interact with an interface (e.g., a web interface) to request access to content. For example, the user may be assigned a task to create deliverable work product for the technology development project (e.g., create a design document, create a requirements specification, etc.), and may want to access (e.g., view, download, etc.) content that may be useful for completing the task. In this case, the user may interact with the user device to select a menu option for requesting access to content, which may prompt the user to select the content that the user would like to access (e.g., a template for creating the deliverable work product, examples relating to similar types of deliverable work product, etc.). In some cases, the user may input free-from text to describe the content that the user would like to access. When the user submits the request, the user device may provide, to the digital content management platform, an identifier associated with the request, a description of the content being requested, and/or the like.

As shown by reference number 132, the digital content management platform may identify a link to the content. The link to the content may be, for example, a link to view the content or a link to download the content. In some implementations, if the user requested to access particular content (e.g., a template of a design document) by selecting a field or menu option of the interface, the request may include an identifier of the particular content, and the digital content management platform may use the identifier to reference a data structure that associates the identifier with the link to the particular content.

In some implementations, if the user describes the content being requested using free-form text, the digital content management platform may process the free-form text (e.g., using a natural language processing technique, as described elsewhere herein) to identify keywords. In this case, the digital content management platform may use the keywords to generate a search query, and may use the search query to search a data structure that associates the keywords with content and/or a link to the content.

In some implementations, the digital content management platform may identify the link to the content by visiting the group of publishing platforms. For example, the digital content management platform may log in to access a publishing platform, and may use a search feature of the publishing platform to identify the link to the content. Additionally, or alternatively, the digital content management platform may identify the link to the content by using a data mining technique to analyze all (or some) content provided by the publishing platform.

As shown by reference number 134, the digital content management platform may obtain related content from the group of data sources. For example, the digital content management platform may obtain related content to provide the user device with additional resources that may be used when creating deliverable work product. In this case, the digital content management platform may search the group of data sources for the related content in a manner similar to that described elsewhere herein.

In some implementations, the digital content management platform may determine whether to obtain the related content based on one or more triggers. For example, the digital content management platform may be configured to obtain the related content if the link to the content is identified, if the link to the content is not identified, if a threshold confidence level is satisfied (e.g., indicating a confidence level that the content provided by the identified link will satisfy the request without a need for related content), and/or the like.

In some implementations, the digital content management platform may determine which related content to obtain using one or more content identification rules. The content identification rules may include a first content identification rule indicating to obtain related content that shares document relationship information with the content requested by the user device (e.g., related content with a similar industry or project domain, project type, content type, document type, content segment type, etc.), a second content identification rule indicating obtain related content that shares a threshold level of similarity with the content requested by the user device, and/or the like.

As shown by reference number 136, the digital content management platform may identify one or more links to the related content, in a manner similar to that described above. As shown by reference number 138, the digital content management platform may provide the link to the content and the links to the related content to the user device.

In this way, the digital content management platform services requests to access content by providing the user device with the requested content and/or with related content. Furthermore, providing the user device with the requested content and with related content conserves processing resources and/or network resources that the user device and/or the digital content management platform might expend when the user is creating the deliverable work product without the related content.

As shown in FIG. 1H, and by reference number 140, a user may, using a user device (shown as User Device 3) interact with an interface to request to remove content. For example, the user may be assigned a task to purge old records that are no longer relevant to the organization. In this case, the user may interact with the user device to select a menu option for removing content, which may prompt the user to select the content that the user would like to remove. When the user submits the request, the user device may provide an identifier associated with the request and any other information that may be used to identify the content that is to be removed.

As shown by reference number 142, the digital content management platform may validate the request. For example, removing content may require certain user privileges (e.g., administrative privileges, etc.). In this case, the digital content management platform may compare a user identifier associated with the user device to a list of user devices that are permitted to remove content. In this case, the digital content management platform may validate the request based on identifying the user device as being part the list of user devices that are permitted to remove the content.

As shown by reference number 144, the digital content management platform may remove the content from the group of publishing platforms and/or the group of data sources. In some implementations, the digital content management platform may provide instructions to the group of publishing platforms to cause the group of publishing platforms to remove the content from the published content. In some implementations, the digital content management platform may provide instructions to the one or more data sources to cause the one or more data sources to remove the content.

In this way, the digital content management platform removes content such that all of the different formats of the content of the document are removed.

As shown in FIG. 1I, and by reference number 146, a user device (shown as User Device 4) may interact with an interface to request to mobilize the content. For example, the user may be assigned a task to move content from the content management system to a client content management system (i.e., a process referred to as content mobilization).

In this case, the user may interact with the user device to select a menu option for mobilizing content, which may prompt the user to select the content that the user would like to mobilize. When the user submits the request, the user device may provide, to the digital content management platform, an identifier associated with the request and/or any other information that may be used to mobilize the content, such as information that may be used to identify the content that is to be mobilized, information that may be used to mobilize the content, and/or the like.

As shown by reference number 148, the digital content management platform may obtain content for mobilization from the group of data sources (e.g., using information included in the request). For example, the user may, as part of the request, input client requirements describing the content that is to be provided to the client content management system. In this case, the digital content management platform may search the group of data sources to obtain a set of documents that include content that satisfies the client requirements.

As shown by reference number 150, the digital content management platform may mobilize the content. For example, to mobilize the content, the digital content management platform may need to eliminate redundant content included in two or more documents, resolve a conflict between two conflicting content values within particular documents, remove content included in the set of documents that is unrelated to the client requirements, modify a format of the content included in the set of documents (e.g., to a format compatible with the client content management system), and/or the like. This may ensure that the mobilized content is compatible with the client content management system and that the content being provided to the client content management system does not include duplicative content and/or content unrelated to the request.

In some implementations, the digital content management platform may create a new document that includes all (or some) of the content ready for mobilization. For example, the digital content management platform may add content from the set of documents into the new documents, such that the document includes only the content ready for mobilization. In some cases, the digital content management platform may have to resolve conflicts identified when adding the content into the new document. For example, if a first document and a second document have a corresponding field, but different content values associated with the field, then the digital content management platform may perform a content resolution technique to identify which value to use within the new document. In this way, the digital content management platform obtains content from multiple documents stored by the content management platform, and intelligently synergizes them into a new document with content ready for mobilization.

In some implementations, the digital content management platform may transform the content into a format supported by the client content management system. For example, the digital content management platform may receive, as part of the request, infrastructure information relating to the client content management system, such as a type of content management system, a cloud provider used to support the content management system, and/or the like. In this case, the digital content management platform may determine whether the client content management system supports a current format of the content. If the current format is not supported, the digital content management platform may transform the content into a format that is capable of being supported by the client content management system (e.g., using one or more of the formatting techniques described elsewhere herein and/or a similar type of formatting technique).

As shown by reference number 152, the digital content management platform may provide the mobilized content to the client content management system. For example, the digital content management platform may provide the mobilized content to the client content management system using one or more APIs and/or another type of communication interface. In some cases, the communication interface may be a secure, protected communication interface.

In some implementations, the digital content management platform may establish a data stream with the client content management system. For example, as new content is created and pushed to the content management system of the organization, the digital content management system may be configured to automatically mobilize the new content, and push the new content to the client content management system of the client organization.

In some implementations, the digital content management platform may generate, for the client content management system, summary statistics relating to the mobilized content. For example, the digital content management platform may generate summary statistics indicating which documents were provided to the client content management system, document section information and/or document relationship information for the documents, recommended actions for managing and utilizing the documents, and/or the like.

In some implementations, the digital content management platform may monitor the client content management system for discrepancies, using one or more techniques described elsewhere herein. In this case, the digital content management platform may generate a recommendation for a client device (e.g., to correct the discrepancy, to request a human user to review the discrepancy, and/or the like), and may provide the recommendation to the client device.

In this way, the digital content management platform obtains content from multiple documents, and intelligently prepares the content for mobilization into the client content management system.

As indicated above, FIGS. 1A-1I are provided merely as an example. Other examples are possible and may differ from what was described with regard to FIGS. 1A-1I. For example, there may be additional devices and/or networks, fewer devices and/or networks, different devices and/or networks, or differently arranged devices and/or networks than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) of example implementations 100 may perform one or more functions described as being performed by another set of devices of example implementations 100.

Figure 2:
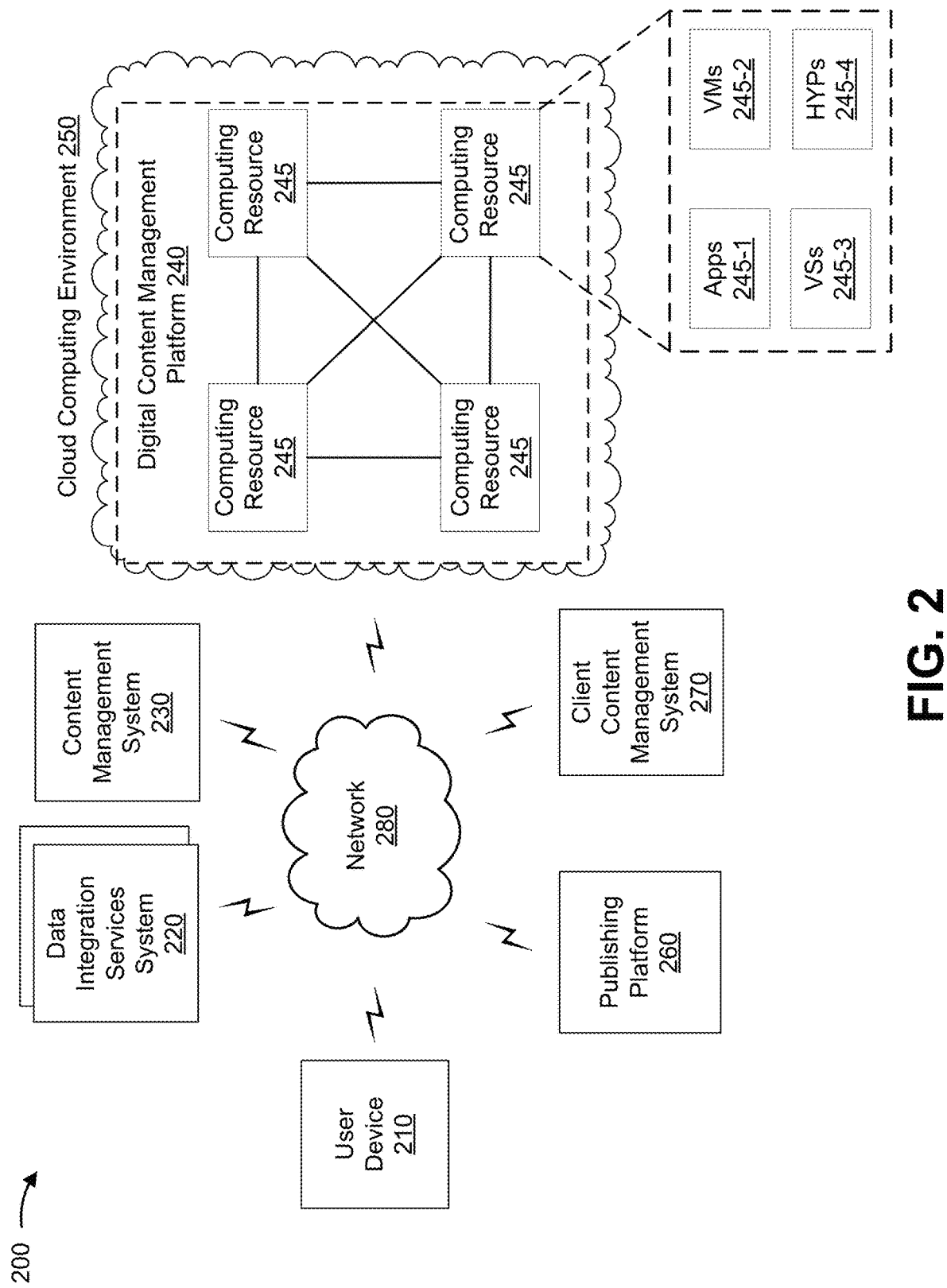
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a data integration services system 220, a content management system 230, a digital content management platform 240 supported by a cloud computing environment 250, a publishing platform 260, a client content management system 270, and/or a network 280. Devices of environment 200 may interconnect via wired connections, wireless connections, or a combination of wired and wireless connections.

User device 210 includes one or more devices capable of receiving, generating, storing, processing, and/or providing information associated with a technology development project. For example, user device 210 may include a communication and/or computing device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device.

In some implementations, user device 210 may provide, to digital content management platform 240, a request to add content to content management system 230. In some implementations, user device 210 may provide a different type of request, such as a request to access content, a request to remove content, a request to mobilize content, and/or the like. In some implementations, user device 210 may receive, from digital content management platform 240, an indication that a request has been completed. In some implementations, user device 210 may be a device of an organization that supports content management system 230. In some implementations, user device 210 may be a device of a client organization that is using one or more services provided by digital content management platform 240.

Data integration services system 220 includes one or more devices capable of receiving, generating, storing, processing, and/or providing information associated with a technology development project. For example, data integration services system may include a server device or a group of server devices. In some implementations, data integration services system 220 may include a group of data sources (e.g., server devices, etc.) used to store content associated with a set of technology development projects of an organization, document information relating to documents that include the content, document relationship information that identify relationships between documents and between particular content, and/or the like. In some implementations, the group of data sources that are part of data integration services system 220 may store replicated document section information and/or replicated document relationship information associated with the set of technology development projects.

Content management system 230 includes one or more devices capable of receiving, generating, storing, processing, and/or providing information associated with a technology development project. For example, content management system 230 may include a server device or a group of server devices.

In some implementations, content management system 230 may store the content associated with the set of technology development projects (e.g., instead of data integration services system 220). In this case, data integration services system 220 may only store the document information (e.g., document section information, document relationship information, etc.), and content management system 230 may store the content. In some implementations, digital content management platform 240 may be included as part of content management system 230. In some implementations, content management system 230 may be separate from digital content management platform 240.

Digital content management platform 240 includes one or more devices capable of receiving, generating, storing, processing, and/or providing information associated with a technology development project. For example, digital content management platform 240 may include a server device (e.g., a host server, a web server, an application server, etc.), a data center device, or a similar device. In some implementations, digital content management platform 240 may interact with a group of data sources (e.g., which may part of data integration services system 220) to obtain and/or receive content for a technology development project, replicated content for the technology development project, related content associated with the technology development project, document information for particular content, replicated document information for the particular content, and/or the like.

In some implementations, as shown, digital content management platform 240 may be hosted in cloud computing environment 250. Notably, while implementations described herein describe digital content management platform 240 as being hosted in cloud computing environment 250, in some implementations, digital content management platform 240 may not be cloud-based (i.e., may be implemented outside of a cloud computing environment) or may be partially cloud-based.

Cloud computing environment 250 includes an environment that hosts digital content management platform 240. Cloud computing environment 250 may provide computation, software, data access, storage, etc. services that do not require end-user knowledge of a physical location and configuration of system(s) and/or device(s) that hosts digital content management platform 240. As shown, cloud computing environment 250 may include a group of computing resources 245 (referred to collectively as "computing resources 245" and individually as "computing resource 245").

Computing resource 245 includes one or more personal computers, workstation computers, server devices, or another type of computation and/or communication device. In some implementations, computing resource 245 may host digital content management platform 240. The cloud resources may include compute instances executing in computing resource 245, storage devices provided in computing resource 245, data transfer devices provided by computing resource 245, and/or the like. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, and/or the like.

Application 245-1 may include one or more software applications that may be provided to or accessed by user device 210. Application 245-1 may eliminate a need to install and execute the software applications on these devices. For example, application 245-1 may include software associated with digital content management platform 240 and/or any other software capable of being provided via cloud computing environment 250. In some implementations, one application 245-1 may send/receive information to/from one or more other applications 245-1, via virtual machine 245-2.

Virtual machine 245-2 may include a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program and may support a single process. In some implementations, virtual machine 245-2 may execute on behalf of another device (e.g., user device 210), and may manage infrastructure of cloud computing environment 250, such as data management, synchronization, or long-duration data transfers.

Virtualized storage 245-3 may include one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 may provide hardware virtualization techniques that allow multiple operating systems (e.g., "guest operating systems") to execute concurrently on a host computer, such as computing resource 245. Hypervisor 245-4 may present a virtual operating platform to the guest operating systems and may manage the execution of the guest operating systems. Multiple instances of a variety of operating systems may share virtualized hardware resources.

Publishing platform 260 includes one or more devices capable of receiving, generating, storing, processing, and/or providing information associated with a technology development project. For example, publishing platform 260 may include a server device or a group of server devices. In some implementations, publishing platform 260 may receive, from digital content management platform 240, content and/or copies of the content associated with a technology development project. In some implementations, publishing platform 260 may interact with user device 210 when user device 210 is accessing content that is published by publishing platform 260.

Client content management system 270 includes one or more devices capable of receiving, generating, storing, processing, and/or providing information associated with a technology development project. For example, client content management system 270 may include a server device or a group of server devices. In some implementations, client content management system 270 may use a different type of content management system than content management system 230, may use a different cloud services provider, and/or the like. In some implementations, client content management system 270 may receive mobilized content from digital content management platform 240.

Network 280 includes one or more wired and/or wireless networks. For example, network 280 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
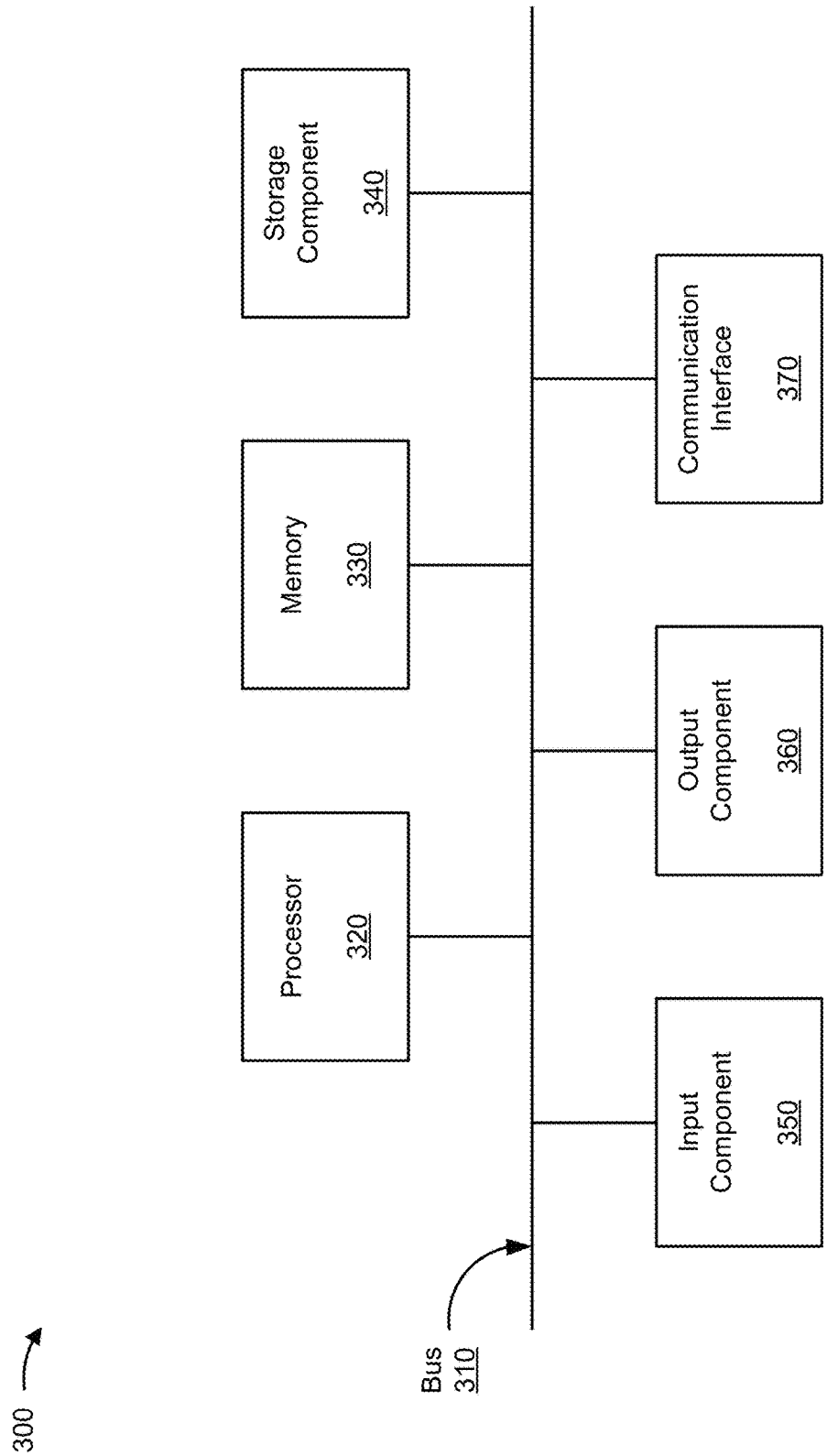
FIG. 3 is a diagram of example components of one or more devices of FIG. 2.

FIG. 3 is a diagram of example components of a device 300. Device 300 may correspond to user device 210, data integration services system 220, content management system 230, digital content management platform 240, publishing platform 260, and/or client content management system 270. In some implementations, user device 210, data integration services system 220, content management system 230, digital content management platform 240, publishing platform 260, and/or client content management system 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
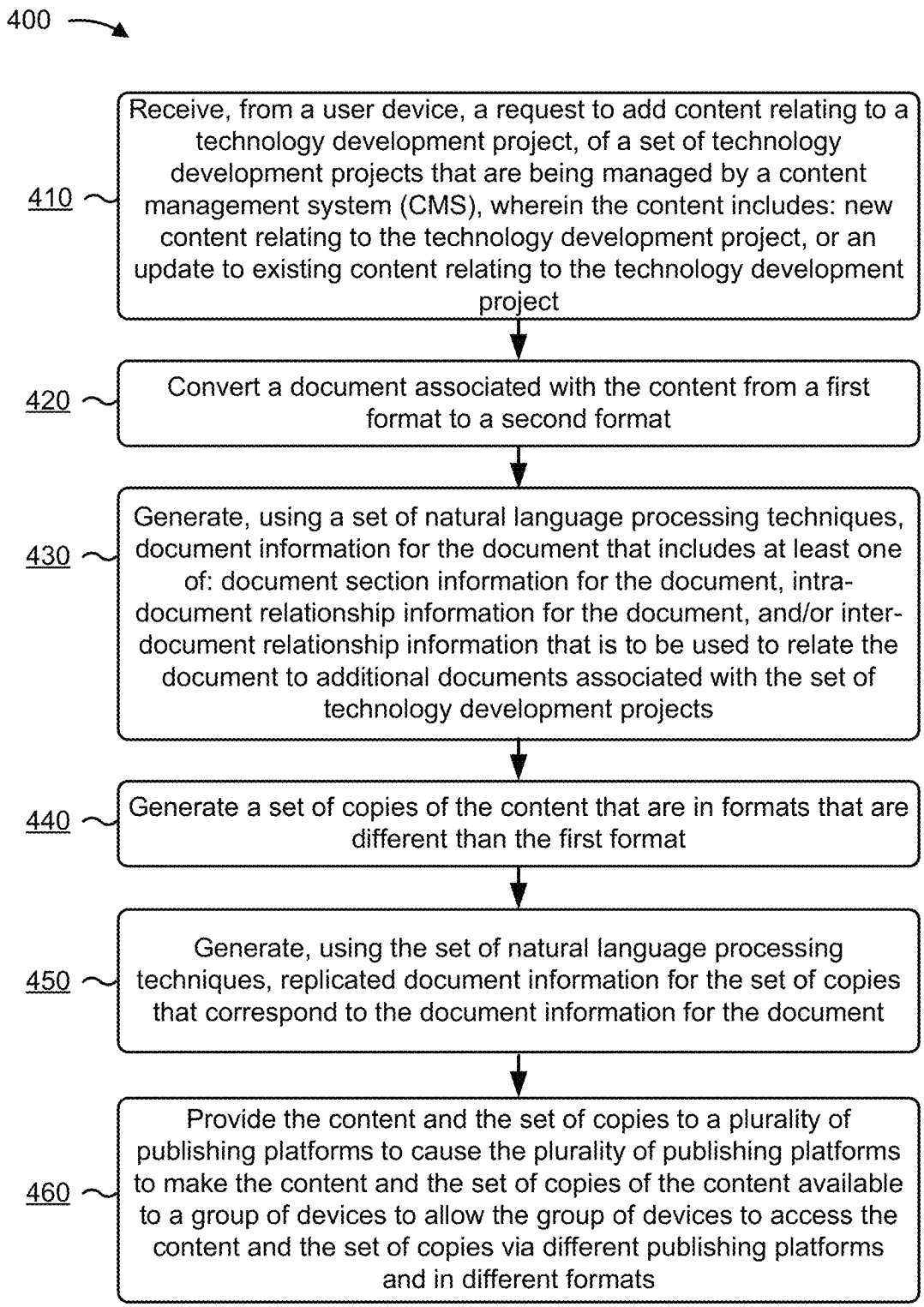
FIGS. 4-6 are flow charts of an example process for managing content relating to a technology development project by associating the content with related content, and by creating copies of the content in multiple formats to allow the content to be accessible via different publishing platforms and/or obtainable (e.g., downloadable) in multiple formats.

FIG. 4 is a flow chart of an example process 400 for managing content relating to a technology development project by associating the content with related content, and by creating copies of the content in multiple formats to allow the content to be accessible via different publishing platforms and/or obtainable (e.g., downloadable) in multiple formats. In some implementations, one or more process blocks of FIG. 4 may be performed by a digital content management platform (e.g., digital content management platform 240). In some implementations, one or more process blocks of FIG. 4 may be performed by another device or a group of devices separate from or including the digital content management platform, such as a user device (e.g., user device 210), a data integration services system (e.g., data integration services system 220), a content management system (e.g., content management system 230), a publishing platform (e.g., publishing platform 260), and/or a client content management system (e.g., client content management system 270).

As shown in FIG. 4, process 400 may include receiving, from a user device, a request to add content relating to a technology development project, of a set of technology development projects that are being managed by a content management system (CMS), wherein the content includes: new content relating to the technology development project, or an update to existing content relating to the technology development project (block 410). For example, the digital content management platform (e.g., digital content management platform 240, using computing resource 245, processor 320, memory 330, input component 350, communication interface 370, etc.) may receive, from the user device (e.g., user device 210), a request to add content relating to a technology development project, of a set of technology development projects that are being managed by the CMS (e.g., CMS 230), as described above with regard to FIGS. 1A-1I. In some implementations, the content may include new content relating to the technology development project or an update to existing content relating to the technology development project.

As further shown in FIG. 4, process 400 may include converting a document associated with the content from a first format to a second format (block 420). For example, the digital content management platform (e.g., digital content management platform 240, using computing resource 245, processor 320, memory 330, etc.) may convert a document associated with the content from a first format to a second format, as described above with regard to FIGS. 1A-1I.

As further shown in FIG. 4, process 400 may include generating, using a set of natural language processing techniques, document information for the document that includes at least one of: document section information for the document, intra-document relationship information for the document, or inter-document relationship information that is to be used to relate the document to additional documents associated with the set of technology development projects (block 430). For example, the digital content management platform (e.g., digital content management platform 240, using computing resource 245, processor 320, memory 330, etc.) may generate, using a set of natural language processing techniques, document information for the document, as described above with regard to FIGS. 1A-1I. In some implementations, the document section information may include document section information for the document, intra-document relationship information for the document, and/or inter-document relationship information that is to be used to relate the document to additional documents associated with the set of technology development projects.

As further shown in FIG. 4, process 400 may include generating a set of copies of the content that are in formats that are different than the first format (block 440). For example, the digital content management platform (e.g., digital content management platform 240, using computing resource 245, processor 320, memory 330, etc.) may generate a set of copies of the content that are in formats that are different than the first format, as described above with regard to FIGS. 1A-1I.

As further shown in FIG. 4, process 400 may include generating, using the set of natural language processing techniques, replicated document information for the set of copies that corresponds to the document information of the document (block 450). For example, the digital content management platform (e.g., digital content management platform 240, using computing resource 245, processor 320, memory 330, etc.) may generate, using the set of natural language processing techniques, replicated document information for the set of copies that corresponds to the document information of the document, as described above with regard to FIGS. 1A-1I.

As further shown in FIG. 4, process 400 may include providing the content and the set of copies to a plurality of publishing platforms to cause the plurality of publishing platforms to make the content and the set of copies of the content available to a group of devices to allow the group of devices to access the content and the set of copies via different publishing platforms and in different formats (block 460). For example, the digital content management platform (e.g., digital content management platform 240, using computing resource 245, processor 320, memory 330, output component 360, communication interface 370, etc.) may provide the content and the set of copies to a plurality of publishing platforms (e.g., publishing platforms 260) to cause the plurality of publishing platforms to make the content and the set of copies of the content available to a group of devices (e.g., user devices 210) to allow the group of devices to access the content and the set of copies via different publishing platforms and in different formats, as described above with regard to FIGS. 1A-1I.

Process 400 may include additional implementations, such as any single implementation or any combination of implementations described below and/or in connection with one or more other processes described elsewhere herein.

In some implementations, the digital content management platform may provide the document information and the replicated information to a data structure to associate the document information and the replicated information with other document information associated with related content. In some implementations, the association may enable the content management platform to receive a request to modify a particular content value of the document that is in a particular format, while providing the content management platform with a way to modify the particular content value in one or more copies of the content that are in other formats.

In some implementations, the set of copies may include a first subset of copies with a first type of format that is capable of being published by the plurality of publishing platforms and a second subset of copies with a second type of format that is capable of being downloaded by the group of devices. In some implementations, the content may be a first type of content that includes deliverable work product for the technology development project, a second type of content that includes instructions used to create the deliverable work product, a third type of content that includes templated content values capable of being used as an outline when creating the deliverable work product, or a fourth type of content that includes content values associated with a proposal of a recommendation relating to the technology development project.

In some implementations, the digital content management platform, when generating the set of copies, may generate, as part of the set of copies, a copy that includes a translation of the content in a particular language that is different than a language used for the content of the document. In some implementations, the digital content management platform, when providing the content and the set of copies to the plurality of publishing platforms, may provide the copy to a particular publishing platform to cause the particular publishing platform to publish the copy to allow the group of devices to access the copy of the content in the particular language.

In some implementations, the digital content management platform may obtain, before generating the set of copies of the content, related content by searching a data structure for the additional documents that are associated with the set of technology development projects. In some implementations, the digital content management platform may process the content and the related content to identify a discrepancy. In some implementations, the digital content management platform may determine that the discrepancy is found in a threshold number of additional documents that include the related content. In some implementations, the digital content management platform may correct the discrepancy by replacing a portion of the content with a portion of the related content based on determining that the discrepancy is found in the threshold number of the additional documents.

In some implementations, the digital content management platform, when generating the set of copies of the content, may generate the set of copies of the content that has had the discrepancy corrected.

In some implementations, the digital content management platform may receive, by another user device and after providing the document and the set of copies to the plurality of publishing platforms, a request to access the content. In some implementations, the digital content management platform may identify a link to a publishing platform, of the plurality of publishing platforms, that provides the content. In some implementations, the digital content management platform may identify additional links to other publishing platforms that include related content by searching a data structure for particular links to documents that share the inter-document relationship information with the document. In some implementations, the digital content management platform may provide, after identifying the additional links, the other user device with the link and the additional links to allow the other user device to access the content and the related content.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
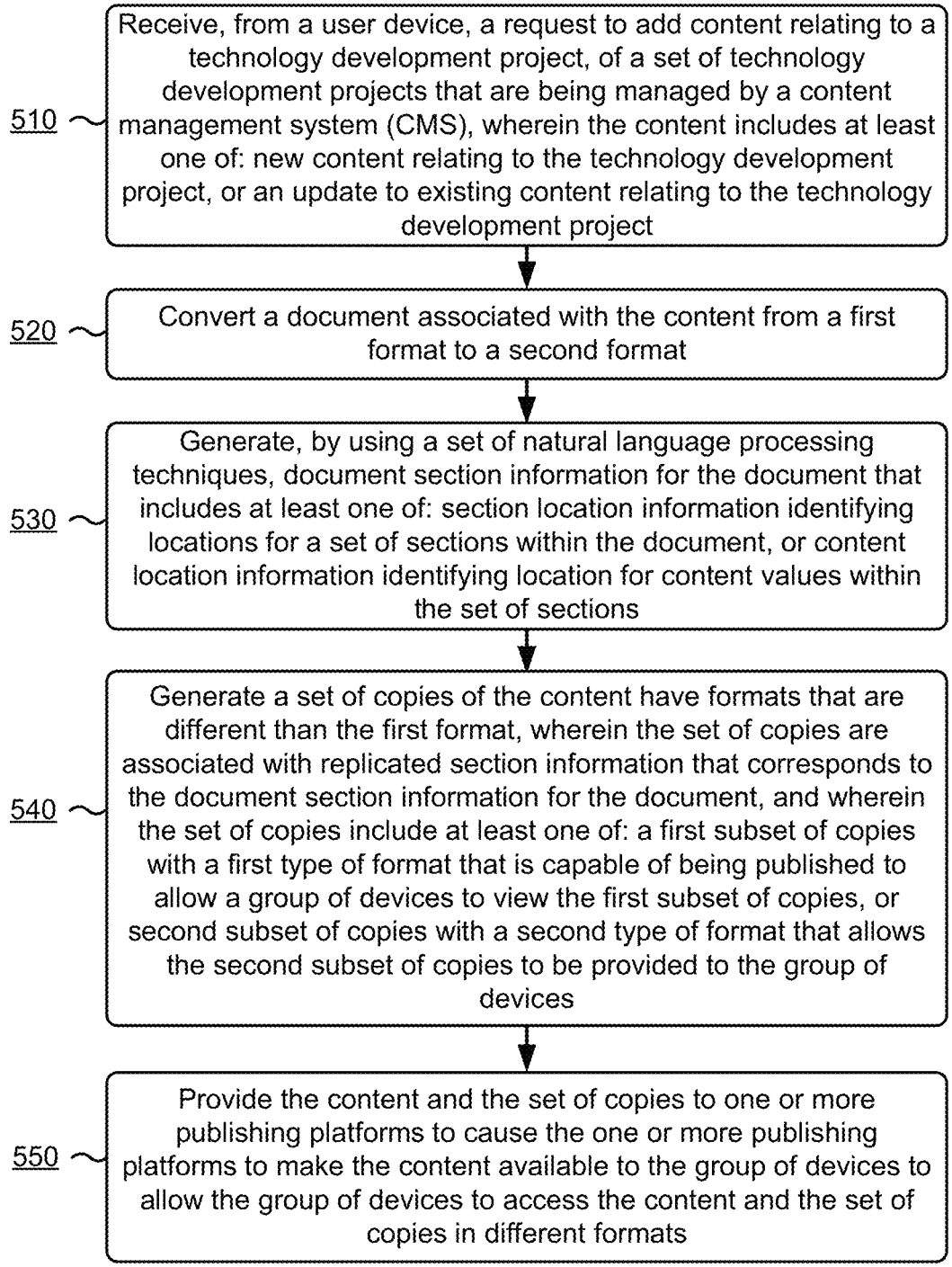

FIG. 5 is a flow chart of an example process 500 for managing content relating to a technology development project by associating the content with related content, and by creating copies of the content in multiple formats to allow the content to be accessible via different publishing platforms and/or obtainable (e.g., downloadable) in multiple formats. In some implementations, one or more process blocks of FIG. 5 may be performed by a digital content management platform (e.g., digital content management platform 240). In some implementations, one or more process blocks of FIG. 5 may be performed by another device or a group of devices separate from or including the digital content management platform, such as a user device (e.g., user device 210), a data integration services system (e.g., data integration services system 220), a content management system (e.g., content management system 230), a publishing platform (e.g., publishing platform 260), and/or a client content management system (e.g., client content management system 270).

As shown in FIG. 5, process 500 may include receiving, from a user device, a request to add content relating to a technology development project, of a set of technology development projects that are being managed by a content management system (CMS), wherein the content includes at least one of: new content relating to the technology development project, or an update to existing content relating to the technology development project (block 510). For example, the digital content management platform (e.g., digital content management platform 240, using computing resource 245, processor 320, memory 330, input component 350, communication interface 370, etc.) may receive, from the user device (e.g., user device 210), a request to add content relating to a technology development project, of a set of technology development projects that are being managed by the CMS (e.g., CMS 230), as described above with regard to FIGS. 1A-1I.

As further shown in FIG. 5, process 500 may include converting a document associated with the content from a first format to a second format (block 520). For example, the digital content management platform (e.g., digital content management platform 240, using computing resource 245, processor 320, memory 330, etc.) may convert a document associated with the content from a first format to a second format, as described above with regard to FIGS. 1A-1I.

As further shown in FIG. 5, process 500 may include generating, by using a set of natural language processing techniques, document section information for the document that includes at least one of: section location information identifying locations for a set of sections within the document, or content location information identifying location for content values within the set of sections (block 530). For example, the digital content management platform (e.g., digital content management platform 240, using computing resource 245, processor 320, memory 330, etc.) may generate, by using a set of natural language processing techniques, document section information for the document, as described above with regard to FIGS. 1A-1I. In some implementations, the document section information may include section location information identifying locations for a set of sections within the document and/or content location information identifying location for content values within the set of sections.

As further shown in FIG. 5, process 500 may include generating a set of copies of the content have formats that are different than the first format, wherein the set of copies are associated with replicated section information that correspond to the document section information for the document, and wherein the set of copies include at least one of: a first subset of copies with a first type of format that is capable of being published to allow a group of devices to view the first subset of copies, or a second subset of copies with a second type of format that allows the second subset of copies to be provided to the group of devices (block 540). For example, the digital content management platform (e.g., digital content management platform 240, using computing resource 245, processor 320, memory 330, etc.) may generate a set of copies of the content have formats that are different than the first format, as described above with regard to FIGS. 1A-1I. In some implementations, the set of copies may be associated with replicated section information that corresponds to the document section information for the document. In some implementations, the set of copies may include a first subset of copies with a first type of format that is capable of being published to allow a group of devices (e.g., user devices 210) to view the first subset of copies and/or a second subset of copies with a second type of format that allows the second subset of copies to be provided to the group of devices.

As further shown in FIG. 5, process 500 may include providing the content and the set of copies to one or more publishing platforms to cause the one or more publishing platforms to make the content available to the group of devices to allow the group of devices to access the content and the set of copies in different formats (block 550). For example, the digital content management platform (e.g., digital content management platform 240, using computing resource 245, processor 320, memory 330, output component 360, communication interface 370, etc.) may provide the content and the set of copies to one or more publishing platforms (e.g., publishing platforms 260) to cause the one or more publishing platforms to make the content available to the group of devices to allow the group of devices to access the content and the set of copies in different formats, as described above with regard to FIGS. 1A-1I.

Process 500 may include additional implementations, such as any single implementation or any combination of implementations described below and/or in connection with one or more other processes described elsewhere herein.

In some implementations, the one or more publishing platforms may be a plurality of publishing platforms.

In some implementations, the digital content management platform may receive a new request to modify a particular content value of the document that is in a particular format. In some implementations, the digital content management platform may identify the particular content value in the document using the section location information. In some implementations, the digital content management platform may modify the particular content value to a new content value. In some implementations, the digital content management platform may identify the particular content value in one or more copies using replicated section location information. In some implementations, the digital content management platform may modify the particular content value in the one or more copies of the content based on the section location information of the document corresponding to the replicated section location information of the one or more copies.

In some implementations, the digital content management platform may generate, using another set of natural language processing techniques, document relationship information that includes intra-document relationship information for the document and inter-document relationship information that is to be used to relate the document to additional documents associated with the set of technology development projects. In some implementations, the digital content management platform may identify, by using the document relationship information to search a data structure, related content that is included in the additional documents. In some implementations, the digital content management platform may determine whether a discrepancy is present as between the content and the related content. In some implementations, the digital content management platform may perform one or more actions associated with reconciling the content and the related content based on determining that the content includes the discrepancy is present. In some implementations, the digital content management platform, when generating the set of copies, may generate the set of copies of the content after performing the one or more actions associated with reconciling the content and the related content.

In some implementations, the digital content management platform may receive, by another user device and after providing the document and the set of copies to the one or more publishing platforms, a new request to modify a particular content value relating to the technology development project. In some implementations, the digital content management platform may perform one or more actions associated with servicing the request to modify the particular content value. The one or more actions may include identifying the particular content value within the content of the document, modifying the particular content value of the document, identifying the particular content value within the set of copies of the content based on the replicated section information corresponding to the document section information, and modifying the particular content value within the set of copies of the content.

In some implementations, the digital content management platform may generate, using another set of natural language processing techniques, document relationship information that includes: intra-document relationship information for the document, and inter-document relationship information that is to be used to relate the document to additional documents associated with the set of technology development projects. In some implementations, the digital content management platform may receive, from another user device and after providing the document and the set of copies to the one or more publishing platforms, a request to access the content in a particular format. In some implementations, the digital content management platform may identify a link to a publishing platform, of the one or more publishing platforms, that offers a copy of the content in the particular format. In some implementations, the digital content management platform may identify additional links to other publishing platforms that include related content by searching a data structure for particular links to one or more of the additional documents associated with the set of technology development projects. In some cases, the related content may be in the particular format. In some implementations, the digital content management platform may provide, after identifying the related content, the other user device with the link and the additional links to allow the other user device to access the content and the related content in the particular format.

In some implementations, the digital content management platform may predict, using a machine learning technique, that other documents managed by the CMS are to be impacted by adding the content of the document to the CMS. In some implementations, the digital content management platform may perform one or more actions associated with reconciling the document and the other documents based on predicting that the other documents are to be impacted by adding the content of the document to the CMS.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
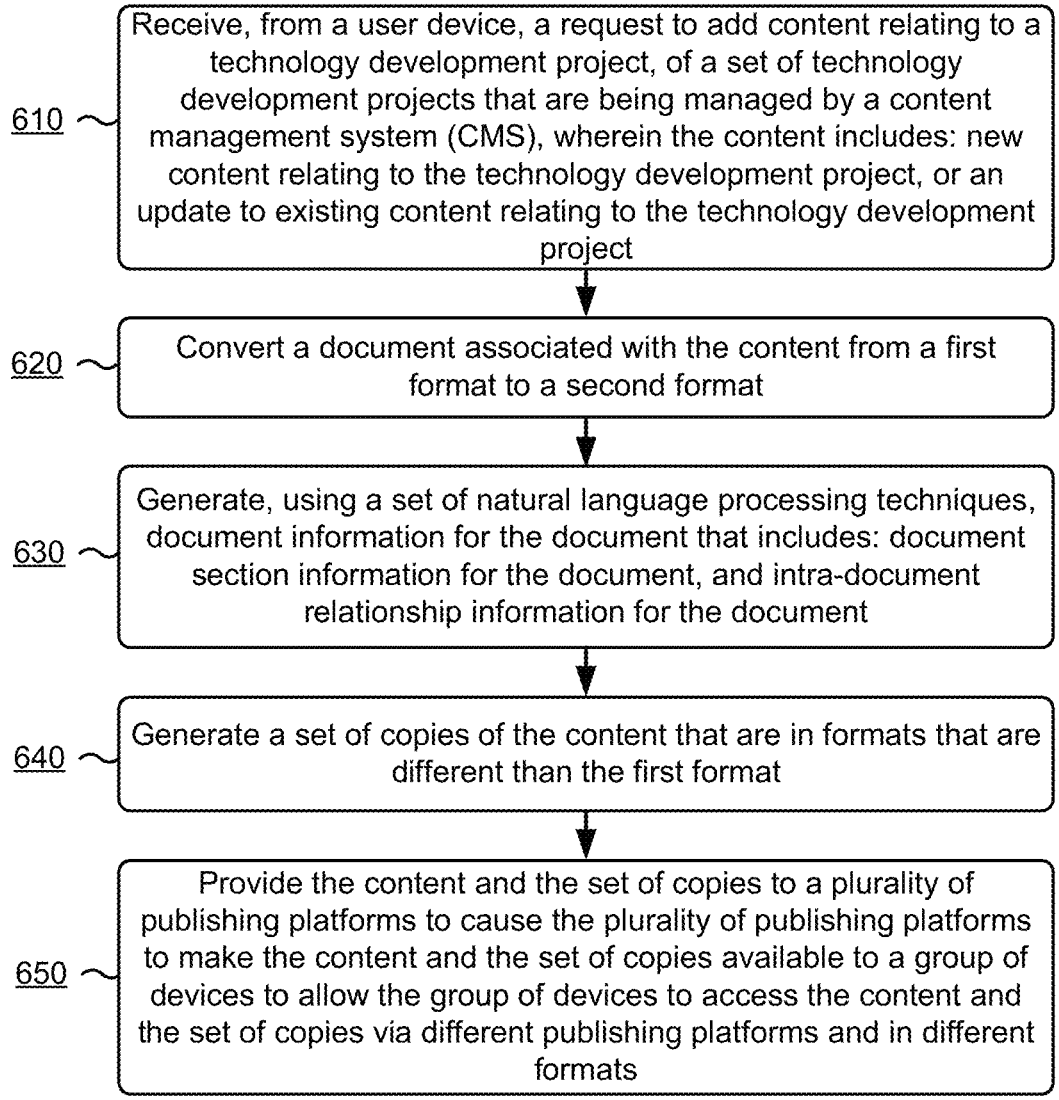

FIG. 6 is a flow chart of an example process 600 for managing content relating to a technology development project by associating the content with related content, and by creating copies of the content in multiple formats to allow the content to be accessible via different publishing platforms and/or obtainable (e.g., downloadable) in multiple formats. In some implementations, one or more process blocks of FIG. 6 may be performed by a digital content management platform (e.g., digital content management platform 240). In some implementations, one or more process blocks of FIG. 6 may be performed by another device or a group of devices separate from or including the digital content management platform, such as a user device (e.g., user device 210), a data integration services system (e.g., data integration services system 220), a content management system (e.g., content management system 230), a publishing platform (e.g., publishing platform 260), and/or a client content management system (e.g., client content management system 270).

As shown in FIG. 6, process 600 may include receiving, from a user device, a request to add content relating to a technology development project, of a set of technology development projects that are being managed by a content management system (CMS), wherein the content includes: new content relating to the technology development project, or an update to existing content relating to the technology development project (block 610). For example, the digital content management platform (e.g., digital content management platform 240, using computing resource 245, processor 320, memory 330, input component 350, communication interface 370, etc.) may receive, from a user device, a request to add content relating to a technology development project, of a set of technology development projects that are being managed by the CMS (e.g., CMS 230), as described above with regard to FIGS. 1A-1I.

As further shown in FIG. 6, process 600 may include converting a document associated with the content from a first format to a second format (block 620). For example, the digital content management platform (e.g., digital content management platform 240, using computing resource 245, processor 320, memory 330, etc.) may convert a document associated with the content from a first format to a second format, as described above with regard to FIGS. 1A-1I.

As further shown in FIG. 6, process 600 may include generating, using a set of natural language processing techniques, document information for the document that includes: document section information for the document, and intra-document relationship information for the document (block 630). For example, the digital content management platform (e.g., digital content management platform 240, using computing resource 245, processor 320, memory 330, etc.) may generate, using a set of natural language processing techniques, document information for the document, as described above with regard to FIGS. 1A-1I. In some implementations, the document information may include document section information for the document and intra-document relationship information for the document.

As further shown in FIG. 6, process 600 may include generating a set of copies of the content that are in formats that are different than the first format (block 640). For example, the digital content management platform (e.g., digital content management platform 240, using computing resource 245, processor 320, memory 330, etc.) may generate a set of copies of the content that are in formats that are different than the first format, as described above with regard to FIGS. 1A-1I.

As further shown in FIG. 6, process 600 may include providing the content and the set of copies to a plurality of publishing platforms to cause the plurality of publishing platforms to make the content and the set of copies available to a group of devices to allow the group of devices to access the content and the set of copies via different publishing platforms and in different formats (block 650). For example, the digital content management platform (e.g., digital content management platform 240, using computing resource 245, processor 320, memory 330, output component 360, communication interface 370, etc.) may provide the content and the set of copies to a plurality of publishing platforms (e.g., publishing platforms 260) to cause the plurality of publishing platforms to make the content and the set of copies available to a group of devices (e.g., user devices 210) to allow the group of devices to access the content and the set of copies via different publishing platforms and in different formats, as described above with regard to FIGS. 1A-1I.

Process 600 may include additional implementations, such as any single implementation or any combination of implementations described below and/or in connection with one or more other processes described elsewhere herein.

In some implementations, the set of copies may include a first subset of copies with a first type of format that is capable of being published by the plurality of publishing platforms and a second subset of copies with a second type of format that is capable of being downloaded by the group of devices. In some implementations, the set of copies may be associated with replicated section information that corresponds to the document section information for the document. In some implementations, the document may be a first document associated with deliverable work product for the technology development project, a second document indicating instructions used to create the deliverable work product, a third document for a template capable of being used as an outline when creating the deliverable work product, or a fourth document of a proposal indicating a recommendation relating to the technology development project.

In some implementations, the digital content management platform may obtain, before generating the set of copies of the content, related content that satisfies a threshold level of similarity with the content of the document. In some implementations, the digital content management platform may process the content and the related content to identify a discrepancy. In some implementations, the digital content management platform may determine that the discrepancy is found in a threshold number of additional documents that include the related content. In some implementations, the digital content management platform may correct the discrepancy by replacing a portion of the content with a portion of the related content based on determining that the discrepancy is found in the threshold number of the additional documents. In some implementations, the digital content management platform, when generating the set of copies of the content, may generate the set of copies of the content that has had the discrepancy corrected.

In some implementations, when generating the set of copies, the digital content management platform may generate, as part of the set of copies, a copy that includes a translation of the content in a particular language that is different than a language used for the content of the document. In some implementations, when providing the content and the set of copies to the plurality of publishing platforms, the digital content management platform may provide the copy to a particular publishing platform to cause the particular publishing platform to publish the copy to allow the group of devices to access the copy of the content in the particular language.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

By making the content accessible via multiple publishing platforms and obtainable in different formats, the digital content management system improves flexibility of the CMS. Additionally, by intelligently marking the content, the digital content management system is equipped to effectively and efficiently manage change. For example, if a change is made to a first section of a first document in a first format, the digital content management system be able to implement the change in the first document, and may also implement the change in one or more copies of the document that are in different formats, have different logical placement of the content within the document, and/or the like. As such, after the change is made, subsequent users may be able to immediately access and/or obtain the same document, with the change implemented, in the different formats and/or via the different publishing platforms.

Additionally, the digital content management platform improves maintainability of the CMS by identifying and correcting discrepancies in the content and the related content. This may conserve memory resources used to store inaccurate content values, processing resources needed to debug program code of a program that crashes as a result of the inaccurate content values, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It is to be understood that the term format, as used herein, refers to formats such as file formats, file types, and/or any other kinds of formats. For example, converting from a first format to a second format may include converting from a first file type to a second file type, converting from a first file format to a second file format, and/or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, operatively connected to the one or more memories, to:
    receive, from a user device, a request to add content relating to a technology development project, of a set of technology development projects that are being managed by a content management system (CMS), wherein the content includes:
        new content relating to the technology development project, or
        an update to existing content relating to the technology development project;
    convert, based on receiving the request, a document, associated with the content, from a first format to a second format;
    generate, based on converting the document and using a set of natural language processing techniques, document information for the document that includes at least one of:
        document section information for the document,
        intra-document relationship information for the document, or
        inter-document relationship information that is to be used to relate the document to additional documents associated with the set of technology development projects;
    generate, based on generating the document information, a set of copies of the content that are in formats that are different than the first format;
    generate, using the set of natural language processing techniques, replicated document information for the set of copies that corresponds to the document information of the document; and
    provide the content and the set of copies to a plurality of publishing platforms to cause the plurality of publishing platforms to make the content and the set of copies of the content available to a group of devices to allow the group of devices to access the content and the set of copies via different publishing platforms and in different formats.

2. The device of claim 1, wherein the one or more processors are further to:
    provide the document information and the replicated document information to a data structure to associate the document information and the replicated document information with other document information associated with related content,
    wherein associating the document information and the replicated document information with the other document information enables the device to receive a request to modify a particular content value of the document that is in a particular format, while providing the device with a way to modify the particular content value in one or more copies of the content that are in other formats.

3. The device of claim 1, wherein the set of copies includes a first subset of copies with a first type of format that is capable of being published by the plurality of publishing platforms and a second subset of copies with a second type of format that is capable of being downloaded by the group of devices.

4. The device of claim 1, wherein the content is:
    a first type of content that includes deliverable work product for the technology development project,
    a second type of content that includes instructions used to create the deliverable work product,
    a third type of content that includes templated content values capable of being used as an outline when creating the deliverable work product, or
    a fourth type of content that includes content values associated with a proposal of a recommendation relating to the technology development project.

5. The device of claim 1, wherein the one or more processors, when generating the set of copies, are to:
    generate, as part of the set of copies, a copy that includes a translation of the content in a particular language that is different than a language used for the content of the document; and
    wherein the one or more processors, when providing the content and the set of copies to the plurality of publishing platforms, are to:
        provide the copy to a particular publishing platform to cause the particular publishing platform to publish the copy to allow the group of devices to access the copy of the content in the particular language.

6. The device of claim 1, wherein the one or more processors are further to:
    obtain, before generating the set of copies of the content, related content by searching a data structure for the additional documents that are associated with the set of technology development projects;
    process the content and the related content to identify a discrepancy;
    determine that the discrepancy is found in a threshold number of additional documents that include the related content;
    correct the discrepancy by replacing a portion of the content with a portion of the related content based on determining that the discrepancy is found in the threshold number of the additional documents; and
    wherein the one or more processors, when generating the set of copies of the content, are to:
        generate the set of copies of the content that has had the discrepancy corrected.

7. The device of claim 1, wherein the one or more processors are further to:
    receive, by another user device and after providing the content and the set of copies to the plurality of publishing platforms, a request to access the content;
    identify a link to a publishing platform, of the plurality of publishing platforms, that provides the content;
    identify additional links to other publishing platforms that include related content by searching a data structure for particular links to documents that share the inter-document relationship information with the document; and
    provide, after identifying the additional links, the other user device with the link and the additional links to allow the other user device to access the content and the related content.

8. A method, comprising:
    receiving, by a device and from a user device, a request to add content relating to a technology development project, of a set of technology development projects that are being managed by a content management system (CMS),
  wherein the content includes at least one of:
    new content relating to the technology development project, or
    an update to existing content relating to the technology development project;
converting, by the device and based on receiving the request, a document associated with the content from a first format to a second format;
generating, by the device and by using a set of natural language processing techniques, document section information for the document based on converting the document,
  wherein the document section information includes at least one of:
    section location information identifying locations for a set of sections within the document, or
    content location information identifying locations for content values within the set of sections;
generating, by the device and based on generating the document section information, a set of copies of the content that have formats that are different than the first format,
  wherein the set of copies are associated with replicated section information that corresponds to the document section information for the document, and
  wherein the set of copies include at least one of:
    a first subset of copies with a first type of format that is capable of being published to allow a group of devices to view the first subset of copies, or
    a second subset of copies with a second type of format that allows the second subset of copies to be provided to the group of devices;
generate, using the set of natural language processing techniques, replicated document section information for the set of copies that corresponds to the document section information of the document; and
providing, by the device, the content and the set of copies to one or more publishing platforms to cause the one or more publishing platforms to make the content and the set of the copies available to the group of devices to allow the group of devices to access the content and the set of copies via one or more different publishing platforms and in different formats.

9. The method of claim 8, wherein the one or more publishing platforms are a plurality of publishing platforms.

10. The method of claim 8, further comprising:
receiving a new request to modify a particular content value of the document that is in a particular format;
identifying the particular content value in the document using the section location information;
modifying the particular content value to a new content value;
identifying the particular content value in one or more copies using replicated section location information; and
modifying the particular content value in the one or more copies of the content based on the section location information of the document corresponding to the replicated section location information of the one or more copies.

11. The method of claim 8, further comprising:
generating, using another set of natural language processing techniques, document relationship information that includes:
  intra-document relationship information for the document, and
  inter-document relationship information that is to be used to relate the document to additional documents associated with the set of technology development projects;
identifying, by using the document relationship information to search a data structure, related content that is included in the additional documents;
determining whether a discrepancy is present as between the content and the related content;
performing one or more actions associated with reconciling the content and the related content based on determining that the content includes the discrepancy is present; and
wherein generating the set of copies comprises:
  generating the set of copies of the content after performing the one or more actions associated with reconciling the content and the related content.

12. The method of claim 8, further comprising:
receiving, by another user device and after providing the content and the set of copies to the one or more publishing platforms, a new request to modify a particular content value relating to the technology development project; and
performing one or more actions associated with servicing the request to modify the particular content value,
  wherein the one or more actions include:
    identifying the particular content value within the content of the document,
    modifying the particular content value of the document,
    identifying the particular content value within the set of copies of the content based on the replicated section information corresponding to the document section information, and
    modifying the particular content value within the set of copies of the content.

13. The method of claim 8, further comprising:
generating, using another set of natural language processing techniques,
document relationship information that includes:
  intra-document relationship information for the document, and
  inter-document relationship information that is to be used to relate the document to additional documents associated with the set of technology development projects;
receiving, from another user device and after providing the content and the set of copies to the one or more publishing platforms, a request to access the content in a particular format;
identifying a link to a publishing platform, of the one or more publishing platforms, that offers a copy of the content in the particular format;
identifying additional links to other publishing platforms that include related content by searching a data structure for particular links to one or more of the additional documents associated with the set of technology development projects,
  wherein the related content is in the particular format; and
providing, after identifying the related content, the other user device with the link and the additional links to allow the other user device to access the content and the related content in the particular format.

14. The method of claim 8, further comprising:
predicting, using a machine learning technique, that other documents managed by the CMS are to be impacted by adding the content of the document to the CMS; and
performing one or more actions associated with reconciling the document and the other documents based on predicting that the other documents are to be impacted by adding the content of the document to the CMS.

15. A non-transitory computer-readable medium storing instructions, the instructions comprising:
one or more instructions that, when executed by one or more processors, cause the one or more processors to:
receive, from a user device, a request to add content relating to a technology development project, of a set of technology development projects that are being managed by a content management system (CMS), wherein the content includes:
new content relating to the technology development project, or
an update to existing content relating to the technology
development project;
convert, based on receiving the request, a document associated with the content from a first format to a second format;
generate, based on converting the document and using a set of natural language processing techniques, document information for the document that includes:
document section information for the document, and
intra-document relationship information for the document;
generate, based on generating the document information, a set of copies of the content that are in formats that are different than the first format; and
provide the content and the set of copies to a plurality of publishing platforms to cause the plurality of publishing platforms to make the content and the set of copies available to a group of devices to allow the group of devices to access the content and the set of copies via different publishing platforms and in different formats.

16. The non-transitory computer-readable medium of claim 15, wherein the set of copies includes a first subset of copies with a first type of format that is capable of being published by the plurality of publishing platforms and a second subset of copies with a second type of format that is capable of being downloaded by the group of devices.

17. The non-transitory computer-readable medium of claim 15, wherein the set of copies are associated with replicated section information that corresponds to the document section information for the document.

18. The non-transitory computer-readable medium of claim 15, wherein the document is:
a first document associated with a deliverable work product for the technology development project,
a second document indicating instructions used to create the deliverable work product,
a third document for a template capable of being used as an outline when creating the deliverable work product, or
a fourth document of a proposal indicating a recommendation relating to the technology development project.

19. The non-transitory computer-readable medium of claim 15, wherein the one or more instructions, when executed by the one or more processors, further cause the one or more processors to:
obtain, before generating the set of copies of the content, related content that satisfies a threshold level of similarity with the content of the document;
process the content and the related content to identify a discrepancy;
determine that the discrepancy is found in a threshold number of additional documents that include the related content;
correct the discrepancy by replacing a portion of the content with a portion of the related content based on determining that the discrepancy is found in the threshold number of the additional documents; and
wherein the one or more instructions, that cause the one or more processors to generate the set of copies of the content, are to:
generate the set of copies of the content that has had the discrepancy corrected.

20. The non-transitory computer-readable medium of claim 15, wherein the one or more instructions, that cause the one or more processors to generate the set of copies, cause the one or more processors to:
generate, as part of the set of copies, a copy that includes a translation of the content in a particular language that is different than a language used for the content of the document; and
wherein the one or more instructions, that cause the one or more processors to provide the content and the set of copies to the plurality of publishing platforms, cause the one or more processors to:
provide the copy to a particular publishing platform to cause the particular publishing platform to publish the copy to allow the group of devices to access the copy of the content in the particular language.

* * * * *